United States Patent
Wu et al.

(10) Patent No.: US 10,636,185 B2
(45) Date of Patent: Apr. 28, 2020

(54) INFORMATION PROCESSING APPARATUS AND INFORMATION PROCESSING METHOD FOR GUIDING A USER TO A VICINITY OF A VIEWPOINT

(71) Applicant: SONY CORPORATION, Tokyo (JP)

(72) Inventors: Jianing Wu, Tokyo (JP); Masaki Fukuchi, Tokyo (JP); Akihiko Kaino, Kanagawa (JP); Tatsuki Kashitani, Tokyo (JP); Shunichi Homma, Tokyo (JP); Shinichiro Abe, Kanagawa (JP); Yuya Hanai, Tokyo (JP); Takaaki Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 13 days.

(21) Appl. No.: 15/313,686

(22) PCT Filed: Mar. 23, 2015

(86) PCT No.: PCT/JP2015/058702
§ 371 (c)(1),
(2) Date: Nov. 23, 2016

(87) PCT Pub. No.: WO2015/182227
PCT Pub. Date: Dec. 3, 2015

(65) Prior Publication Data
US 2017/0193679 A1    Jul. 6, 2017

(30) Foreign Application Priority Data
May 30, 2014   (JP) ................................ 2014-112384

(51) Int. Cl.
*G06T 11/60*    (2006.01)
*G06T 19/00*    (2011.01)
(Continued)

(52) U.S. Cl.
CPC .............. *G06T 11/60* (2013.01); *G01C 21/20* (2013.01); *G01C 21/3629* (2013.01);
(Continued)

(58) Field of Classification Search
CPC ................................. G01C 21/20; G01C 21/26
See application file for complete search history.

(56) References Cited

U.S. PATENT DOCUMENTS 6,483,521 B1 * 11/2002 Takahashi ............... G06T 15/04
345/582
9,105,088 B1 * 8/2015 Petrie ...................... G06T 5/002
(Continued)

FOREIGN PATENT DOCUMENTS

EP          2860702 A1 * 4/2015 ........... H04N 13/004
JP    2011-095797         5/2011
(Continued)

OTHER PUBLICATIONS

Original Document and Machine Translation for JP 2012118882 A.*
(Continued)

*Primary Examiner* — Terrell M Robinson
(74) *Attorney, Agent, or Firm* — Paratus Law Group, PLLC

(57) ABSTRACT

There is provided an information processing apparatus to present, to a user, an additional image, which is a virtual object, in a manner superimposed on a real-space image at a position corresponding to a viewpoint in the real space, the image processing apparatus including a processing unit configured to display an additional image corresponding to a viewpoint of a user in the real world, and guide the user to the vicinity of the viewpoint in the real world where the additional image has been acquired.

23 Claims, 17 Drawing Sheets

(51) Int. Cl.
*G06F 3/048* (2013.01)
*G06T 7/73* (2017.01)
*G01C 21/20* (2006.01)
*G01C 21/36* (2006.01)
*G06F 3/16* (2006.01)
*G06T 5/00* (2006.01)
*G06T 11/00* (2006.01)

(52) U.S. Cl.
CPC ......... *G01C 21/3667* (2013.01); *G06F 3/048* (2013.01); *G06F 3/167* (2013.01); *G06T 5/002* (2013.01); *G06T 7/75* (2017.01); *G06T 11/001* (2013.01); *G06T 19/00* (2013.01); *G06T 2207/20221* (2013.01); *G06T 2207/30244* (2013.01)

(56) References Cited

U.S. PATENT DOCUMENTS

| | | | | |
|---|---|---|---|---|
| 2002/0114532 | A1* | 8/2002 | Ratner | G06T 9/00 382/266 |
| 2004/0125106 | A1* | 7/2004 | Chen | H04N 13/133 345/426 |
| 2007/0132662 | A1* | 6/2007 | Morita | G06F 3/014 345/8 |
| 2009/0195650 | A1* | 8/2009 | Hanai | G06T 11/60 348/143 |
| 2011/0096093 | A1* | 4/2011 | Oi | G06T 19/006 345/633 |
| 2012/0044247 | A1* | 2/2012 | Naimark | G06T 15/205 345/419 |
| 2012/0140040 | A1* | 6/2012 | Sakurai | G06T 19/006 348/46 |
| 2013/0013204 | A1* | 1/2013 | Kazama | G01C 21/20 701/533 |
| 2013/0071028 | A1* | 3/2013 | Schiller | G06T 5/003 382/180 |
| 2013/0121618 | A1* | 5/2013 | Yadav | G06T 5/008 382/294 |
| 2013/0135348 | A1* | 5/2013 | Anzai | G06T 19/006 345/633 |
| 2013/0257908 | A1* | 10/2013 | Ota | G06T 19/006 345/633 |
| 2014/0368532 | A1* | 12/2014 | Keane | G02B 27/017 345/619 |

FOREIGN PATENT DOCUMENTS

| | | |
|---|---|---|
| JP | 2011-193243 | 9/2011 |
| JP | 2012-118882 | 6/2012 |
| JP | 2012-123546 | 6/2012 |
| JP | 2012-165276 | 8/2012 |
| JP | 2012-174116 | 9/2012 |
| WO | WO2013-187130 A1 | 12/2013 |

OTHER PUBLICATIONS

Original Document for EP 2860702 A1.*

Nakano, et al., On-site Virtual Time Machine—Navigation to Past Camera Position and Past Picture Superimpose on Present Landscape, Information Processing Society of Japan, Dec. 2011, pp. 3611-3624, vol. 52 No. 12.

* cited by examiner

FIG. 5
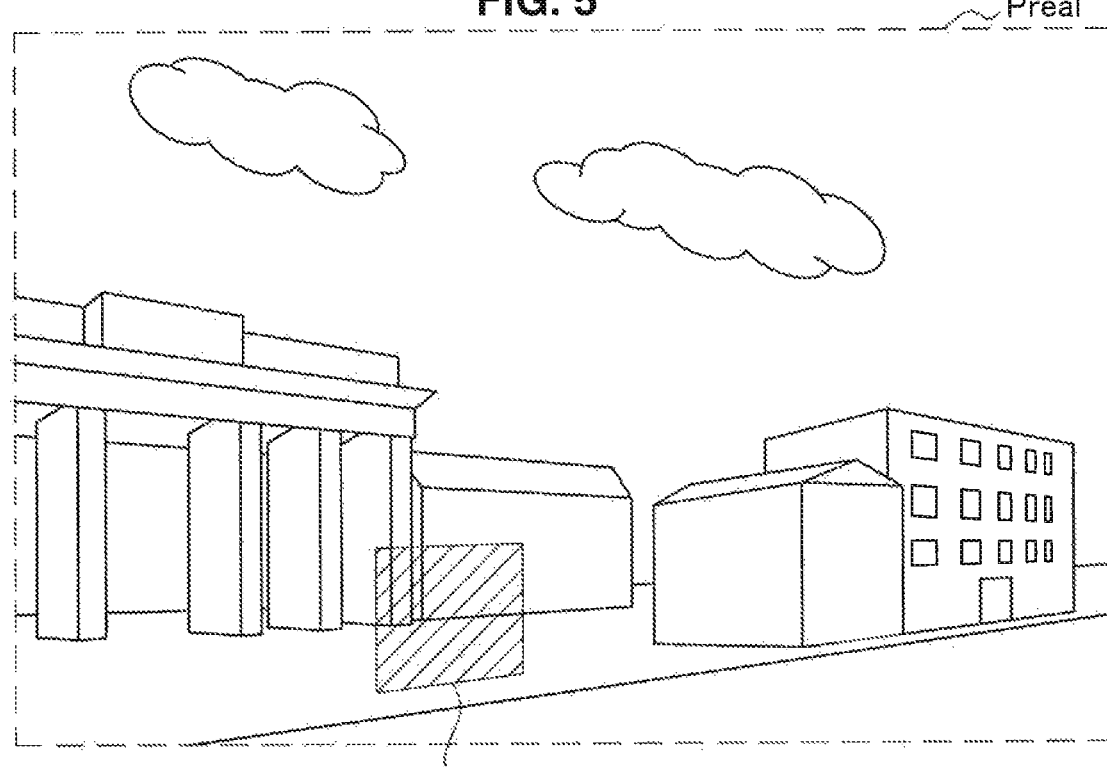
VIEWPOINT POSITION OF ADDITIONAL IMAGE
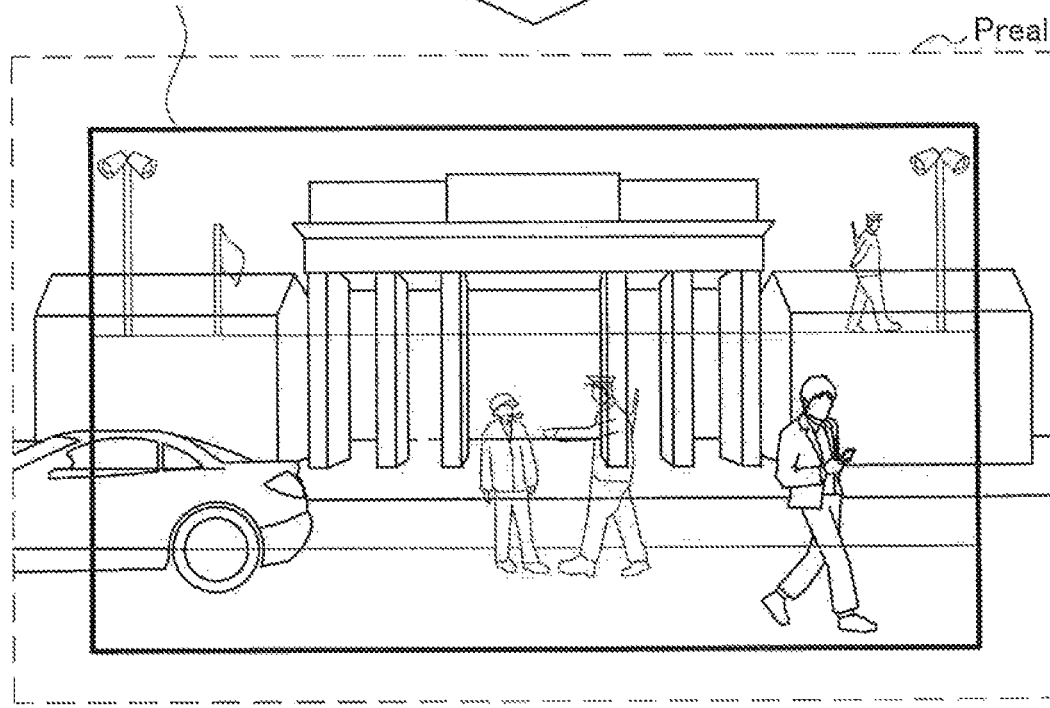

INFORMATION PROCESSING APPARATUS AND INFORMATION PROCESSING METHOD FOR GUIDING A USER TO A VICINITY OF A VIEWPOINT

CROSS REFERENCE TO PRIOR APPLICATION

This application is a National Stage Patent Application of PCT International Patent Application No. PCT/JP2015/058702 (filed on Mar. 23, 2015) under 35 U.S.C. § 371, which claims priority to Japanese Patent Application No. 2014-112384 (filed on May 30, 2014), which are all hereby incorporated by reference in their entirety.

TECHNICAL FIELD

The present disclosure relates to an information processing apparatus and an information processing method.

BACKGROUND ART

In recent years, a technique called Augmented Reality (AR) is drawing attention, which presents the user with additional information in a manner superimposed on the real space. The information presented to the user through the AR technique is visualized as virtual objects of various forms such as texts, icons, animations, or the like. Virtual objects are arranged in the AR space according to the positions of real objects with which the virtual objects are associated. Virtual objects are generally displayed on a display of a mobile communication terminal such as a mobile phone, a smart phone or a tablet terminal, or a wearable terminal such as a head-mount display (abbreviated as "HMD", in the following), an eye-glass type terminal, or the like.

CITATION LIST

Patent Literature

Patent Literature 1: JP 2011-193243A

SUMMARY OF INVENTION

Technical Problem

Here, when the virtual object is a photograph or a picture of a place that agrees with the real space, or the like, the angle of view in the AR space may not agree with that in the real space depending on the angle at which the virtual object displayed in the AR space is viewed, thereby failing to sufficiently provide a sense as if the real world has been augmented. Accordingly, it is desirable to present such a virtual object to the user at a position corresponding to the viewpoint in the real space.

Solution to Problem

According to the present disclosure, there is provided an information processing apparatus including a processing unit configured to display an additional image corresponding to a viewpoint of a user in a real world, and guide the user to a vicinity of a viewpoint in the real world at which the additional image has been acquired.

According to the present disclosure, there is provided an information processing method including: displaying an additional image corresponding to a viewpoint of a user in a real world, and guiding the user to a vicinity of a viewpoint in the real world at which the additional image has been acquired.

According to the present disclosure, the user is guided so as to be able to view an additional image, which is a virtual object at a position corresponding to the viewpoint in the real space.

Advantageous Effects of Invention

According to the present disclosure described above, a virtual object is presented to the user, with the position corresponding to the viewpoint in the real space being taken into account. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is an explanatory diagram illustrating an exemplary display of a billboard-type object as exemplary presentation of visual guidance information according to the embodiment.

DESCRIPTION OF EMBODIMENT(S)

Figure 1:
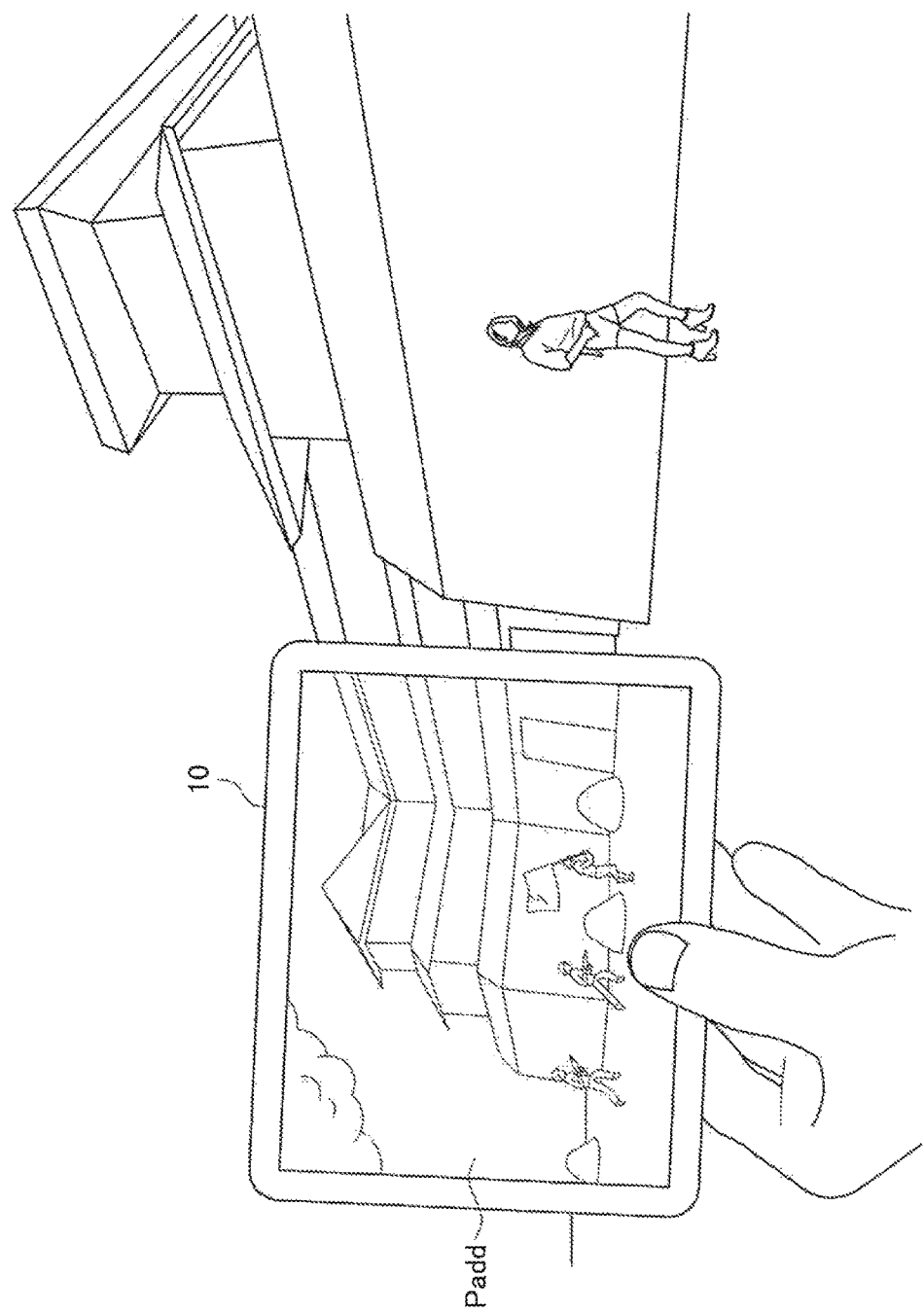
FIG. 1 is an explanatory diagram illustrating an exemplary additional image presented as a virtual object via a device.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. First embodiment
   1.1. Outline
   1.2. Functional configuration
   (1) First processing unit
   (2) Storage unit
   (3) Second processing unit
   1.3. Content of process
   (1) Preliminary process
   (2) Additional image presentation process
2. Second embodiment
3. Exemplary hardware configuration 1. First Embodiment

[1.1. Outline]

First, an outline of a virtual object presented together with a real-space image by an information processing apparatus according to a first embodiment of the present disclosure will be described, referring to FIG. 1. FIG. 1 is an explanatory diagram illustrating an exemplary additional image represented as a virtual object via a device 10.

The information processing apparatus according to the present embodiment is a device configured to display, on the basis of the user's position and direction in the real world, a photograph taken or a picture painted in the past in a place nearby, in a manner superimposed on the real-space image as an additional image. When the user shoots the real space with the device 10, a photograph taken or a picture painted at the position at a different time is presented in a manner superimposed on the real-space image as an additional image, as illustrated in FIG. 1, for example.

The information processing apparatus performs a process of displaying on the device 10 including an image-capturing unit and a display, such as, for example, a mobile communication terminal such as a mobile phone, a smart phone or a tablet terminal, a wearable terminal such as an HMD or an eye-glass type terminal, an image-capturing device such as a digital camera or the like. The information processing apparatus may be installed in the device 10, or may be installed in an information processing terminal, a server, or the like, which is communicable with the device 10.

When presenting the aforementioned additional image, the information processing apparatus first constructs a three-dimensional model representing the real space based on a plurality of images of the real world. The information processing apparatus then performs a matching process between preliminarily acquired additional information and the three-dimensional model based on the user's acquired position and direction, and estimates the position and the posture of the additional image to be presented so that the viewpoint of the additional image corresponds to the real space. Furthermore, the information processing apparatus guides the user to a position at which the user can view the additional image in a manner corresponding to the real world, based on the estimated position and posture of the additional image. Accordingly, the user can view the additional image in a state in which an angle of view of the additional image agrees with an angle of view of the real space, whereby it becomes possible to sufficiently obtain a sense as if the real world is augmented.

[1.2. Functional Configuration]

Figure 2:
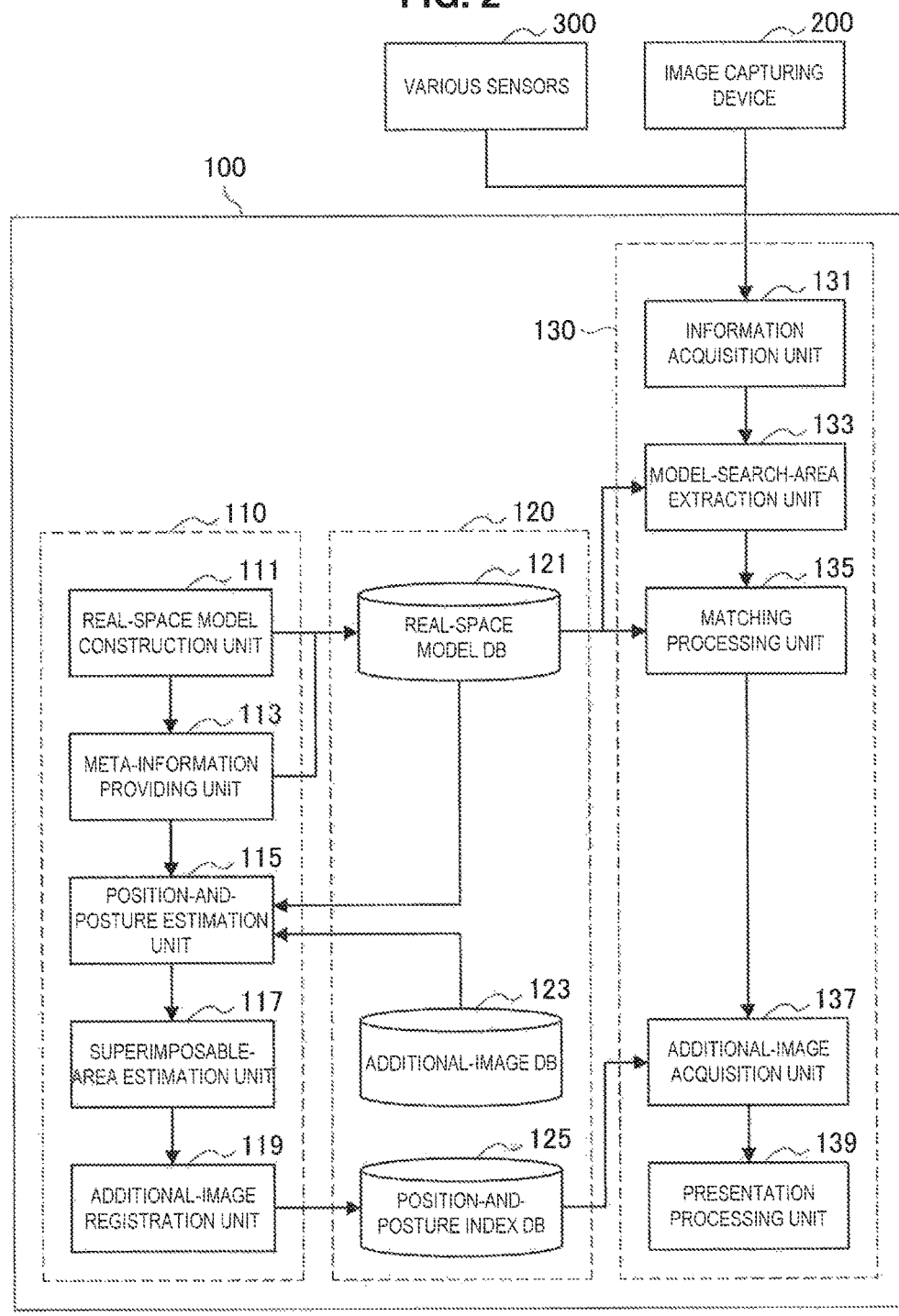
FIG. 2 is a block diagram illustrating a functional configuration of an information processing apparatus according to a first embodiment of the present disclosure.

Next, a functional configuration of an information processing apparatus 100 according to the present embodiment will be described, referring to FIG. 2. FIG. 2 is a block diagram illustrating the functional configuration of the information processing apparatus 100 according to the present embodiment. The information processing apparatus 100 according to the present embodiment includes a first processing unit 110, a storage unit 120, and a second processing unit 130, as illustrated in FIG. 2.

(1) First Processing Unit

The first processing unit 110 performs a preliminary process for displaying an additional image based on the user's position information. The first processing unit 110 basically functions offline. The first processing unit 110 includes, as illustrated in FIG. 2, a real-space model construction unit 111, a meta-information providing unit 113, a position-and-posture estimation unit 115, a superimposable-area estimation unit 117, and an additional-image registration unit 119.

The real-space model construction unit 111 constructs a three-dimensional model of the real world. The real-space model construction unit 111 collects a large number of captured images of the real world such as historic buildings or objects to be landmarks, and constructs a three-dimensional model by matching common parts (characteristic points) in respective images. On this occasion, the model may be acquired using an infrared ray, a laser sensor or the like, in addition to the captured images of the real world in order to increase the precision of the three-dimensional model, or a 3D model acquired from design documents of buildings or the like, may be used. Upon acquiring a newly captured image of the real world, the real-space model construction unit 111 reconstructs the three-dimensional model at a predetermined timing by learning. Accordingly, a three-dimensional model agreeing with the real world may be acquired. The real-space model construction unit 111 stores the constructed three-dimensional model in the storage unit 120.

The meta-information providing unit 113 provides meta information to the three-dimensional model of the real world constructed by the real-space model construction unit 111. For example, information indicating passability in the real world, environmental information such as material of the land surface may be mentioned as meta information. Such meta information may be acquired from information added to images used to construct the three-dimensional model, or geographic information, traffic information, map information or the like, which may be acquired via a network. The meta-information providing unit 113 stores meta information in the storage unit 120 in association with position information in the three-dimensional model of the real world. Note that the meta-information providing unit 113 need not always be installed in the information processing apparatus 100.

The position-and-posture estimation unit 115 estimates a viewpoint of an additional image superimposed on the real-space image. The position-and-posture estimation unit 115 performs matching between the three-dimensional model constructed by the real-space model construction unit 111 and the additional image, and estimates the position and the viewpoint at which the additional image has been acquired (also referred to as "additional image acquisition position" and "additional-image viewpoint", respectively, in the following).

The superimposable-area estimation unit 117 estimates a superimposable area, based on the additional image acquisition position and the additional-image viewpoint. The superimposable area is an area in which an additional image is visible in the real world with a predetermined size and within a predetermined angle of view. The superimposable-area estimation unit 117 outputs the superimposable area of each additional image estimated from the additional image acquisition position and the additional-image viewpoint to the additional-image registration unit 119.

The additional-image registration unit 119 stores the additional image, the additional image acquisition position, the additional-image viewpoint, and the superimposable area in the storage unit 120 in association with one another. The additional image stored in the storage unit 120 by the additional-image registration unit 119 is presented to the user by the second processing unit 130.

(2) Storage Unit

The storage unit 120 stores information to be processed by the information processing apparatus 100. The storage unit 120 includes, for example, a real-space model DB 121, an additional-image DB 123, and a position-and-posture index DB 125, as illustrated in FIG. 2.

The real-space model DB 121 stores the three-dimensional model of the real world constructed based on the captured image of the real world. The three-dimensional model is acquired by the real-space model construction unit 111 learning based on images captured by a device itself including the information processing apparatus 100, or images held by a server or the like capable of communicating with the information processing apparatus 100. The three-dimensional model stored in the real-space model DB 121 is updated each time it is reconstructed by the real-space model construction unit 111. In addition, the real-space model DB 121 stores meta information, which is associated with the position information of the three-dimensional model by the meta-information providing unit 113.

The additional-image DB 123 stores additional image to be displayed in a manner superimposed on the real-space image. The additional image stored in the additional-image DB 123 may be preliminarily stored, or may be acquired as appropriate, and subsequently stored, from a server capable of communicating with the information processing apparatus 100 or the like. The additional image stored in the additional-image DB 123 is used by the position-and-posture estimation unit 115.

The position-and-posture index DB 125 stores the additional image, the additional image acquisition position, the additional-image viewpoint, and the superimposable area in association with one another. The position-and-posture index DB 125 stores, for the additional image stored in the additional-image DB 123, the superimposable area estimated by the superimposable-area estimation unit 117, and the additional image acquisition position and the additional-image viewpoint estimated by the position-and-posture estimation unit 125. The information stored by the position-and-posture index DB 125 is used to present the additional image together with the real-space image according to the user's position information.

(3) Second Processing Unit

The second processing unit 130 presents the additional image together with the real-space image according to the user's position information. The second processing unit 130 basically functions online. The second processing unit 130 includes, as illustrated in FIG. 2, an information acquisition unit 131, a model-search-area extraction unit 133, a matching processing unit 135, an additional-image acquisition unit 137, and a presentation processing unit 139.

The information acquisition unit 131 acquires a real-space image of the real world in the user's current position from an image capturing device 200, and acquires sensor information from various sensors 300. For example, a GPS, an infrared sensor, a laser sensor and the like may be mentioned as the various sensors 300. The information acquisition unit 131 outputs the acquired real-space image and sensor information to the model-search-area extraction unit 133.

The model-search-area extraction unit 133 narrows down the area in which the matching process is performed with the real-space image acquired in the three-dimensional model, based on the sensor information. For example, the model-search-area extraction unit 133 identifies the user's current position based on the position information acquired by the GPS among the pieces of sensor information, and extracts an area likely to be included in the user's field of vision from the three-dimensional model. The model-search-area extraction unit 133 outputs information for identifying the extracted area to the matching processing unit 135. Note that the model-search-area extraction unit 133 need not always be installed in the information processing apparatus 100.

The matching processing unit 135 performs a matching process between the real-space image acquired by the image capturing device 200 and the three-dimensional model. On this occasion, the matching processing unit 135 may select, as a target of matching with the real-space image, only the area extracted by the model-search-area extraction unit 133 in the three-dimensional model stored in the real-space model DB 121. Accordingly, the amount of calculation in the matching process may be reduced, thereby increasing the processing speed. Having associated the three-dimensional model with the real-space image by the matching process, the matching processing unit 135 outputs the position information and the viewpoint information of the real-space image in the three-dimensional model to the additional-image acquisition unit 137.

The additional-image acquisition unit 137 acquires an additional image included in the real-space image, based on the user's position and viewpoint in the real world. The additional-image acquisition unit 137 performs matching of the additional-image acquisition position and the additional-image viewpoint, with the position information and the viewpoint information of the real-space image identified by the matching processing unit 135, and extracts the additional image included in the real-space image from the position-and-posture index DB 125. On this occasion, the additional-image acquisition unit 137 acquires the additional-image acquisition position, the additional-image viewpoint, and the superimposable area associated with the extracted additional image.

The presentation processing unit 139 performs a process of presenting, to the user, information relating to the additional image acquired by the additional-image acquisition unit 137 together with the real-space image. The presentation processing unit 139 changes the manner of presenting the additional information, according to the relative positional relation between the real-space image and the user. When, for example, the user is located in a superimposable area, the presentation processing unit 139 presents the additional image itself in a manner superimposed on the real-space image. When, on the other hand, the user is not located within a superimposable area, the presentation processing unit 139 presents information for guiding the user to a superimposable area together with the real-space image, according to the relative positional relation with the additional-image viewpoint. The processing by the presentation processing unit 139 allows the user to view the additional image at a place where the viewpoint agrees with the real-space image.

[1.3. Content of Process]

Next, a process performed by the information processing apparatus 100 according to the present embodiment will be described. The process performed by the information processing apparatus 100 according to the present embodiment includes a preliminary process which is performed offline, and an additional image presentation process which is performed online. In the following, the respective processes will be described in sequence.

(1) Preliminary Process

Figure 3:
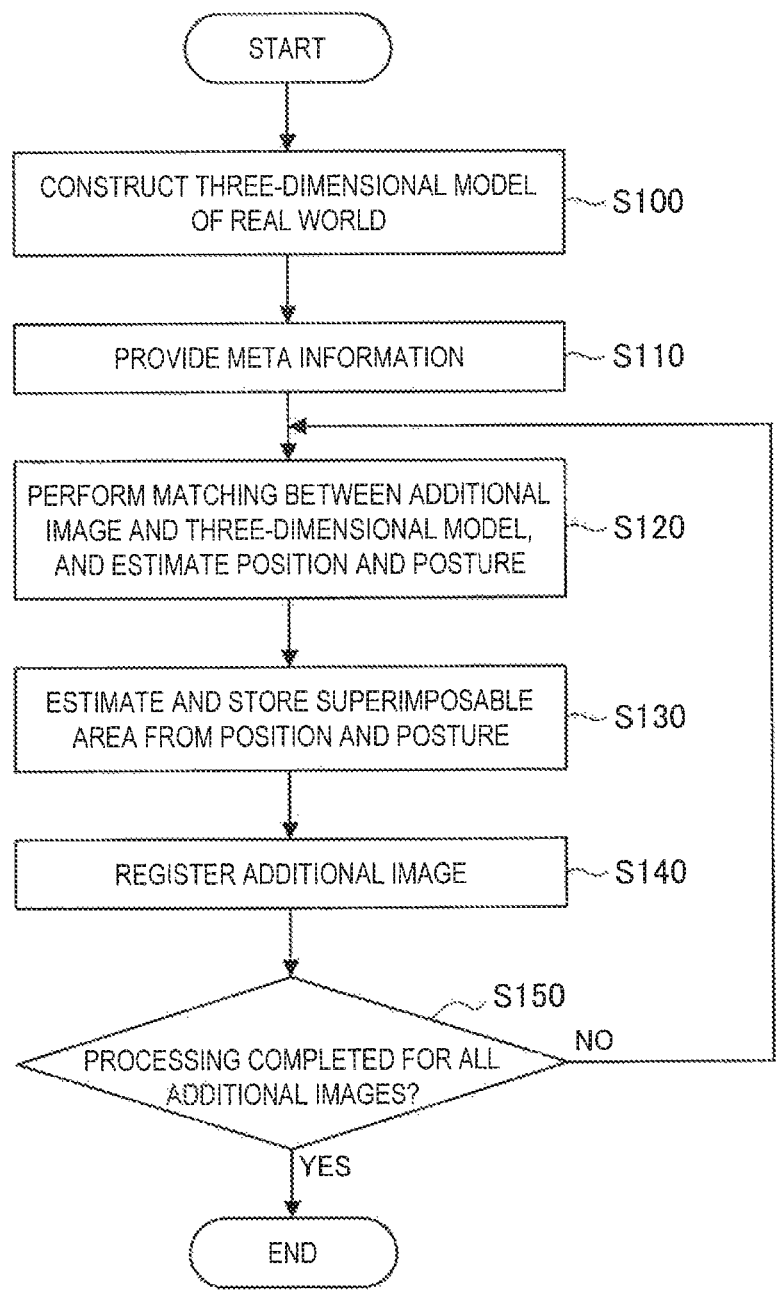
FIG. 3 is a flowchart illustrating the content of a preliminary process performed by the information processing apparatus according to the embodiment.

First, a preliminary process performed by the information processing apparatus 100 will be described, referring to FIG. 3. FIG. 3 is a flowchart illustrating the content of the preliminary process performed by the information processing apparatus 100 according to the present embodiment.

The information processing apparatus 100 acquires, preliminarily in an offline manner, the positional relation between the three-dimensional model of the real world and the additional image so that an additional image added according to the user's position information may be selected together with the real-space image. The information processing apparatus 100 first constructs a three-dimensional model of the real world using the real-space model construction unit 111 (S100). The real-space model construction unit 111 collects captured images of the real world such as images captured by a device itself including the information processing apparatus 100, or images held by a server or the like capable of communicating with the information processing apparatus 100, and constructs the three-dimensional model by matching characteristic points in respective images. On this occasion, the model may be acquired based on search results using an infrared or a laser sensor or the like included in the various sensors 300, in addition to the captured images of the real world in order to increase the precision of three-dimensional model. Alternatively, the real-space model construction unit 111 may use a 3D model acquired from design documents of buildings or the like.

Upon acquiring a new captured image of the real world, the real-space model construction unit 111 reconstructs the three-dimensional model at a predetermined timing by learning. Accordingly, a three-dimensional model agreeing with the real world may be acquired. The real-space model construction unit 111 stores the constructed three-dimensional model in the storage unit 120.

Subsequently, the meta-information providing unit 113 provides meta information to the three-dimensional model of the real world constructed by the real-space model construction unit 111 (S110). The meta information, which is, for example, information indicating passability in the real world, material of the land surface, or the like, is stored in the real-space model DB 121 together with the three-dimensional model in association with the position information in the three-dimensional model of the real world. Accordingly, in the three-dimensional model, it is possible to grasp, as information, a place where the user cannot pass or a place where it is necessary to use a vehicle such as a boat when moving around.

Upon acquiring a three-dimensional model provided with meta information, the information processing apparatus 100 performs a matching process between the additional image stored in the additional-image DB 123 and the three-dimensional model using the position-and-posture estimation unit 115, and estimates the position and the posture when the additional image has been acquired (S120). The position-and-posture estimation unit 115 identifies the position and the posture at which the three-dimensional model and the additional image agree with each other, and estimates the agreeing position and posture to be the additional-image acquisition position and the additional-image viewpoint at which the additional image has been acquired.

Furthermore, a superimposable area is estimated by the superimposable area estimation unit 117, based on the additional-image acquisition position and the additional-image viewpoint (S130). The superimposable area in which the additional image is visible in the real world with a predetermined size and within a predetermined angle of view is an area in which the additional image is presented to the user so that the viewpoint of the additional image corresponds to the real space. Using the superimposable area makes it possible to guide the user to a position at which the additional image may be appropriately viewed.

The additional-image acquisition position, the additional-image viewpoint, and the superimposable area estimated at steps S120 and S130 are stored in the position-and-posture index DB 125 together with the additional image by the additional-image registration unit 119 (S140).

Subsequently, the information processing apparatus 100 determines whether or not the processes at steps S120 to S140 have been performed on all the additional images stored in the additional-image DB 123 (S150), and repeatedly performs the processes until the aforementioned processes are completed for all the additional images. When the processes at steps S120 to S140 are completed for all the additional images stored in the additional-image DB 123, the information processing apparatus 100 then terminates the process illustrated in FIG. 3.

(2) Additional Image Presentation Process

Figure 4:
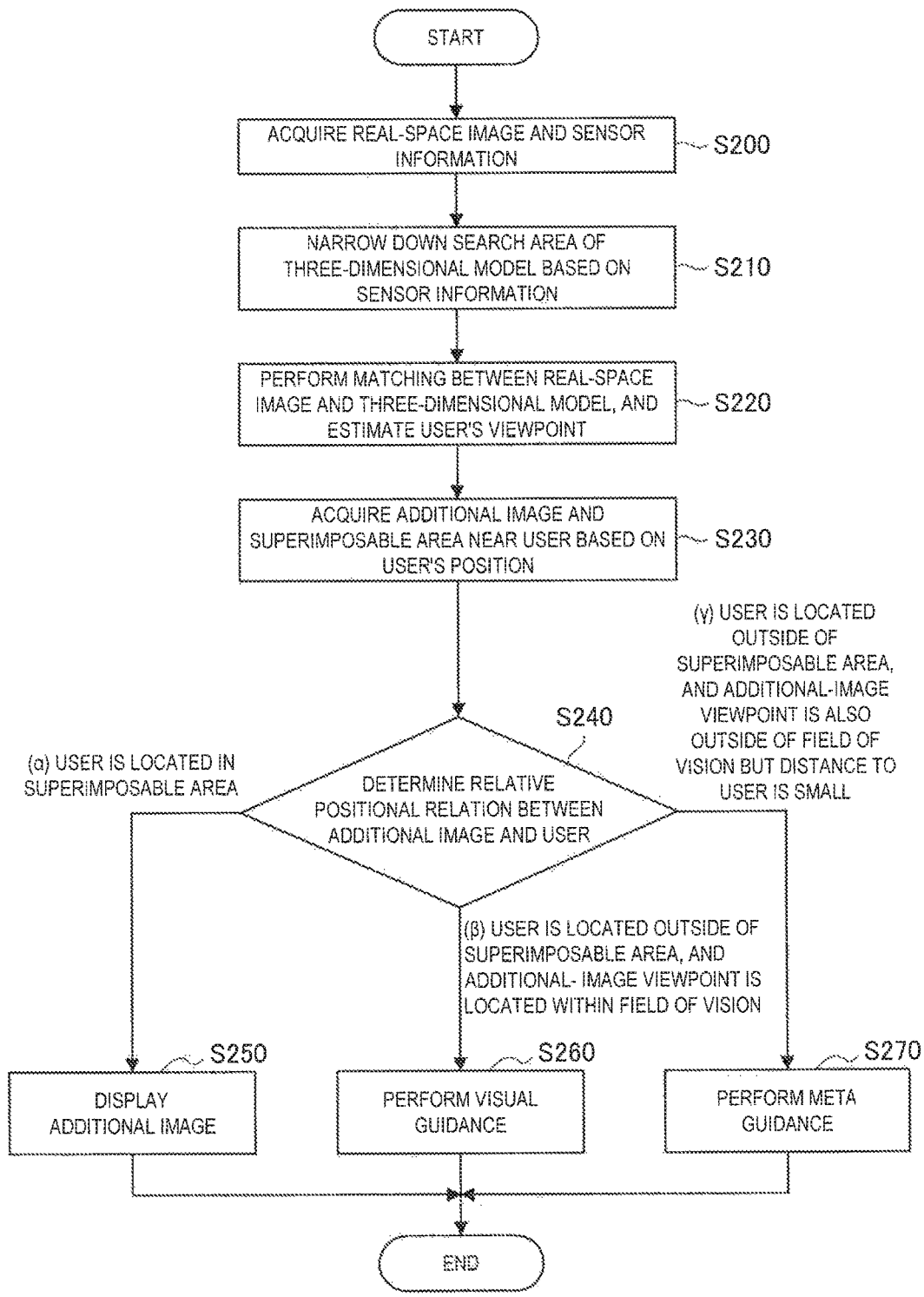
FIG. 4 is a flowchart illustrating the content of an additional image presentation process performed by the information processing apparatus according to the embodiment.

Next, an additional image presentation process performed by the information processing apparatus 100 will be described, referring to FIG. 4. FIG. 4 is a flowchart illustrating the content of the additional image presentation process performed by the information processing apparatus 100 according to the present embodiment.

(S200: Information Acquisition)

Upon recognizing the user's position information online, the information processing apparatus 100 presents the additional image together with the real-space image. On this occasion, the information processing apparatus 100, using the information acquisition unit 131, first acquires the real-space image at the user's current position from the image capturing device 200, and then acquires sensor information from the various sensors 300 (S200). The information acquisition unit 131 outputs the acquired real-space image and sensor information to the model-search-area extraction unit 133.

(S210: Model-Search-Region Extraction)

Next, the model-search-area extraction unit 133 narrows down the area within the three-dimensional model in which matching with the acquired real-space image is to be performed, based on the sensor information (S210). At step S210, the user's current position is identified based on the position information acquired by GPS, for example, whereby an area likely to be included in the user's field of vision is extracted from the three-dimensional model. Accordingly, the amount of calculation in the matching process between the real-space image and the three-dimensional model to be performed at step S220 described below may be reduced, thereby increasing the processing speed.

(S220: Matching Between Real-Space Image and Three-Dimensional Model)

The matching processing unit 135 then performs the matching process between the real-space image acquired by the image capturing device 200 and the three-dimensional model (S220). On this occasion, the matching processing unit 135 may increase the processing speed by selecting only the area extracted at step S210 within the three-dimensional model for matching with the real-space image. Upon associating the three-dimensional model with the real-space image by the matching process, the matching processing unit 135 outputs the position information and the viewpoint information of the real-space image in the three-dimensional model to the additional-image acquisition unit 137.

(S230: Additional-Image Acquisition)

Subsequently, the additional-image acquisition unit 137 acquires an additional image included in the real-space image, based on the user's position and viewpoint in the real world (S230). The additional-image acquisition unit 137 performs matching of the additional-image acquisition position and the additional-image viewpoint, with the position information and the viewpoint information of the real-space image, and extracts the additional image included in the real-space image from the position-and-posture index DB 125. On this occasion, the additional-image acquisition unit 137 acquires the additional-image acquisition position, the additional-image viewpoint, and the superimposable area associated with the 6 extracted additional image.

(S240 to S270: Additional Image Presentation)

The presentation processing unit 139 then determines how to present the information relating to the additional image acquired by the additional-image acquisition unit 137 to the user together with the real-space image (S240). In the present embodiment, the manner of presenting the information relating to the additional image is changed according to the following three patterns.

(α) the user is located within the superimposable area (β) the user is located outside of the superimposable area, but the additional-image viewpoint is within the field of vision (γ) the user is located outside of the superimposable area, and the additional-image viewpoint is also outside of the field of vision but the distance to the user is small.

(Pattern α) Present Additional Image As-Is

First, when the user is located within the superimposable area (α), the presentation processing unit 139 presents the additional image together with the real-space image (S250). In such a case, the user's viewpoint position viewing the real world and the additional-image viewpoint substantially agree even when the additional image is superimposed, as-is, on the real-space image, thereby enabling the user to view the images without any sense of discomfort.

Here, when the additional image is displayed by the presentation processing unit 139 in a manner superimposed on the real-space image, a large difference in the color tones between the real-space image and the additional image may reduce the sense of immersion to a superimposed image. Therefore, the presentation processing unit 139 may adjust the color tones in the boundary between the real-space image and the additional image in order to increase the sense as if the real world has been augmented. On this occasion, the color tone of the real-space image may be adjusted to conform with that of the additional image, or the color tone of the additional image may be adjusted to conform with that of the real-space image. The process of adjusting the color tone is performed in the following sequence, for example: analyzing the color distribution of pixels in the boundary, adjusting the pixel color in the boundary, and blurring the boundary line between the two images.

(Pattern β) Guidance by Visual Guidance Information

Next, when the user is located outside of the superimposable area but the additional-image viewpoint is within the field of vision (β), the presentation processing unit 139 presents visual guidance information together with the real-space image, and guides the user to the superimposable area (S260). The visual guidance information presented at step S260 is information displayed in order to let the user move to the superimposable area in which the additional image may be viewed at an appropriate viewpoint position. An exemplary display of visual guidance information will be described, referring to FIGS. 5 to 8.

Example of Displaying Visual Guidance Information

In the exemplary display of visual guidance information illustrated in FIG. 5, an object 12 substantially perpendicular to the line of sight of the additional-image viewpoint is displayed as visual guidance information in a manner superimposed on a real-space image $P_{real}$. When the additional-image viewpoint is included in the real-space image $P_{real}$ captured by the image capturing device 200, the presentation processing unit 139 displays the object 12 representing the additional image like a billboard in the real-space image $P_{real}$, as illustrated in the upper part of FIG. 5. On this occasion, displaying the object 12 substantially perpendicular to the line of sight of the additional-image viewpoint allows the user to visually recognize the viewpoint of the additional image.

The user, viewing the object 12 illustrated in the upper part of FIG. 5, moves to the front of the object 12. Subsequently, when the various sensors 300 detect that the user is located within the superimposable area of the additional image, the presentation processing unit 139 presents an additional image $P_{add}$ to the user, superimposing the additional image $P_{add}$ on the real-space image $P_{real}$ as illustrated in the lower part of FIG. 5. On this occasion, the viewpoint positions of respective images agree with each other, enabling the user to recognize the superimposed image without any sense of discomfort. For example, as illustrated in FIG. 5, the appearance of the real world and the appearance in the past at the same place may be viewed at the same time.

Figure 6:
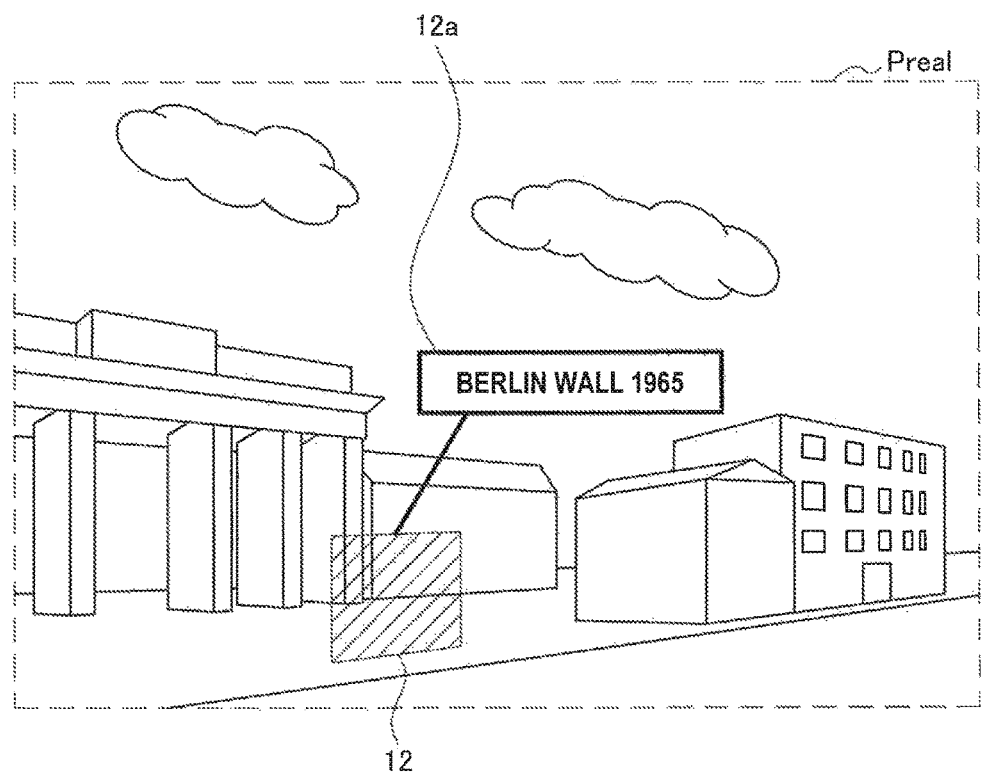
FIG. 6 is an explanatory diagram illustrating an example in which a text object is added to the object of FIG. 5.

Note that the object 12 may be the same image as the additional image, may be a simplified image of the additional image, or may simply be a board-shaped object. Alternatively, as illustrated in FIG. 6, the object 12 may be displayed together with a text object 12a explaining the content of the additional image. Displaying the text object 12a together with the object 12 as illustrated in FIG. 6 allows the user to recognize the content of the additional image without having to move to view the same.

Figure 7:
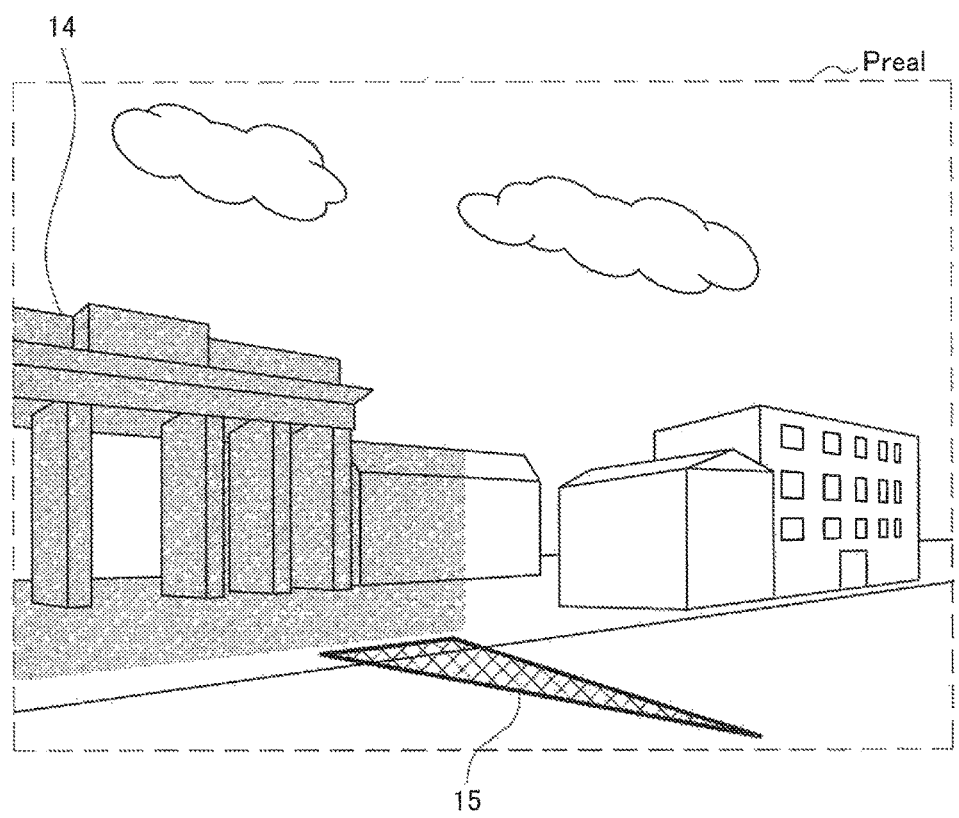
FIG. 7 is an explanatory diagram illustrating an exemplary display of a three-dimensional model of an additional image representing the content of the additional image three-dimensionally on a real-space image, as an exemplary presentation of visual guidance information according to the embodiment.

In addition, another exemplary display of visual guidance information is illustrated in FIG. 7. FIG. 7 illustrates, as visual guidance information, an additional-image three-dimensional model 14 displaying the content of the additional image $P_{add}$ on the real-space image $P_{real}$ in a three-dimensional manner. The additional-image three-dimensional model 14, representing objects included in the 26 additional image $P_{add}$, among the topography or buildings existing in the real-space image $P_{real}$ in a manner distinguishable from other objects, may display them in a different color tone, as illustrated in FIG. 7, for example. Displaying the additional-image three-dimensional model 14 allows the user to recognize that there exists the additional image $P_{add}$ in which the range is included.

In addition, the presentation processing unit 139 may display, together with the additional-image three-dimensional model 14, a superimposable-area object 15 indicating a part corresponding to a superimposable area of the additional image $P_{add}$. The superimposable area is determined according to the angle of view and pitch of the additional image $P_{add}$, and the distance from the additional image. The presentation processing unit 139 displays, for example, the land surface part of the real-space image $P_{real}$ corresponding to the superimposable area as the superimposable-area object 15 emphasized by coloring or surrounding with a frame, for example. In the example of FIG. 7, the substantially triangular superimposable-area object 15 is displayed in the front of the additional-image three-dimensional model 14.

Displaying the superimposable-area object 15 allows the user to recognize that the user can view the additional image $P_{add}$ including the range indicated in the additional-image three-dimensional model 14 by moving into the superimposable-area object 15. Note that the superimposable-area object 15 may be displayed together with the aforementioned billboard-type object 12, as illustrated in FIG. 8.

Using Meta Information

As has been described above, the information processing apparatus 100 may guide the user to a position at which the user can appropriately view the additional image $P_{add}$ by displaying visual guidance information such as the object 12, the additional-image three-dimensional model 14, and the superimposable-area object 15 in a manner superimposed on the real-space image $P_{real}$. Here, the additional image $P_{add}$ may have camera information such as the focal distance or the angle of view, for example, associated therewith as meta information. Therefore, the presentation processing unit 139 may estimate the correct shooting viewpoint of the additional image $P_{add}$ using meta information and display a virtual camera or a photographer indicating the shooting viewpoint, in a manner superimposed on the real-space image $P_{real}$.

Figure 8:
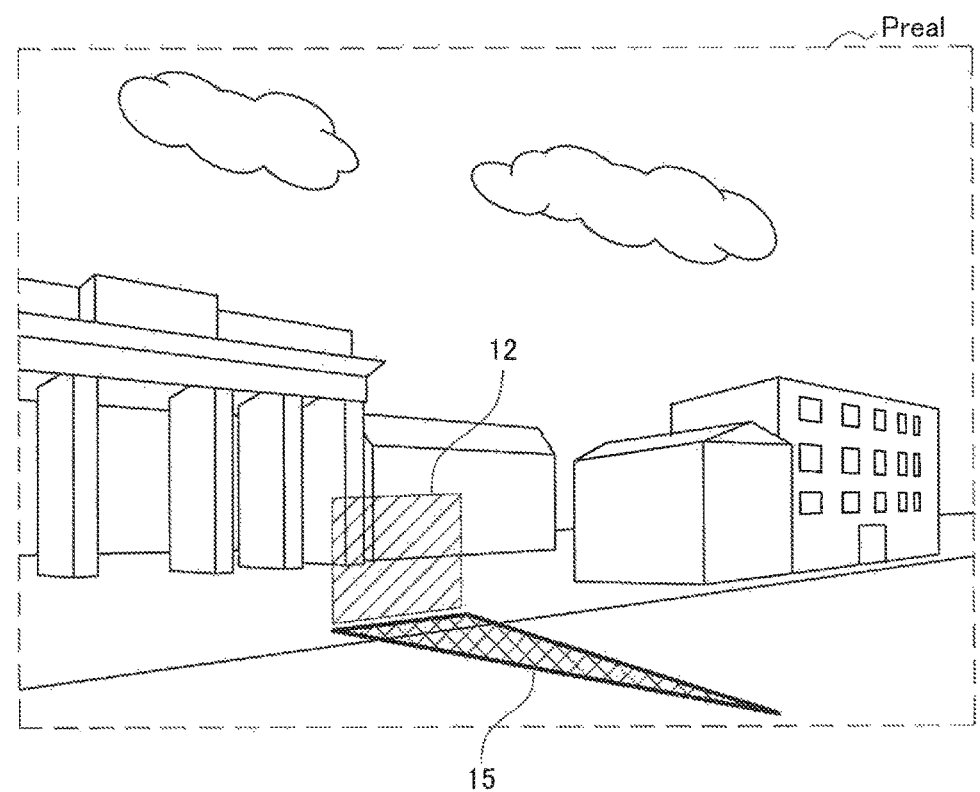
FIG. 8 is an explanatory diagram illustrating an example in which a superimposable-area object is presented in addition to the object of FIG. 5.
Figure 9:
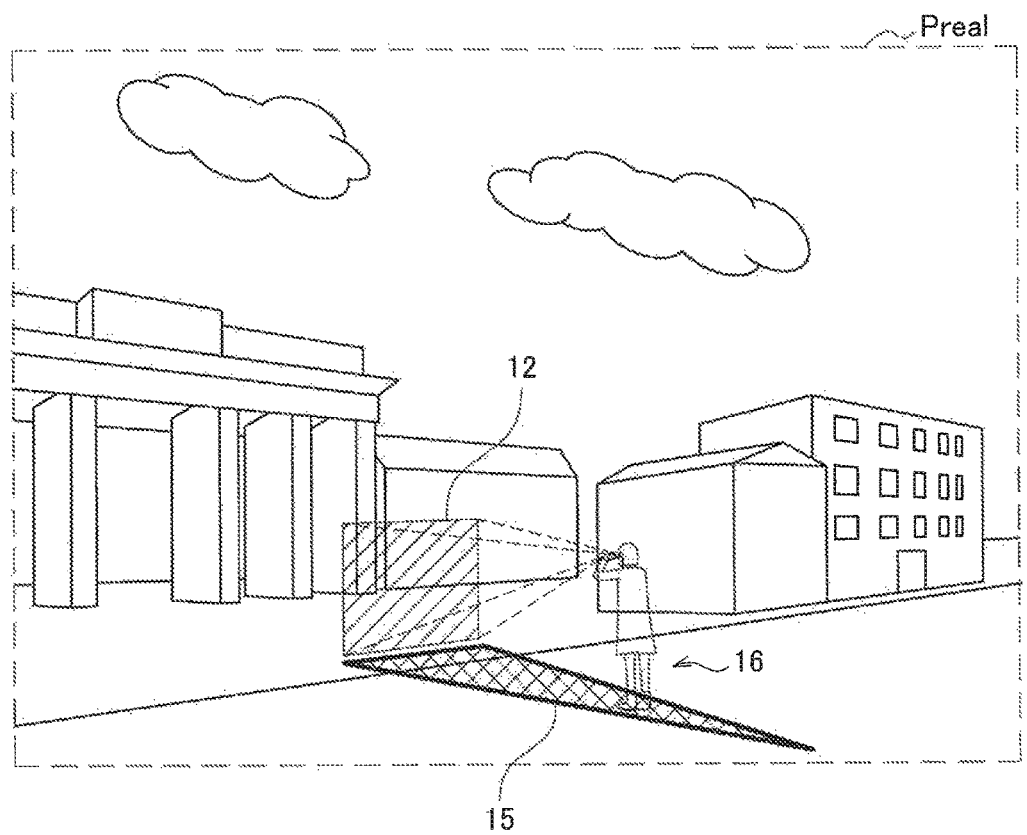
FIG. 9 is an explanatory diagram illustrating an example in which a photographer object is presented in addition to the object of FIG. 8 and the superimposable-area object.

For example, as illustrated in FIG. 9, a photographer object 16 having photographed the additional image $P_{add}$ corresponding to the object 12 may be displayed together with the billboard-type object 12 and the superimposable-area object 15 illustrated in FIG. 8. On this occasion, adjusting the shooting viewpoint of the photographer object 16 to agree with the viewpoint of the object 12 allows the user to present the superimposable area more accurately.

In addition, there may be a case where the angles of view of the real-space image $P_{real}$ and the additional image $P_{add}$ are different. When, for example, the angle of view $\theta_{real}$ of the real-space image $P_{real}$ is smaller than the angle of view $\theta_{add}$ of the additional image $P_{add}$, a part of the image may be cut off in the additional-image viewpoint, as illustrated in the upper part of FIG. 10. Therefore, the presentation processing unit 139 may present an image without cut-offs to the user by acquiring and comparing the angles of view between images from the camera information provided to the respective images. In the example illustrated in FIG. 10, the presentation processing unit 139 adjusts the angle of view $\theta_{add}$ of the additional image $P_{add}$ to agree with the angle of view $\theta_{real}$ of the real-space image $P_{real}$. Accordingly, an image without cut-offs is presented to the user, with the angles of view of the additional image $P_{add}$ and the real-space image $P_{real}$ agreeing, as illustrated in the lower part of FIG. 10.

Figure 10:
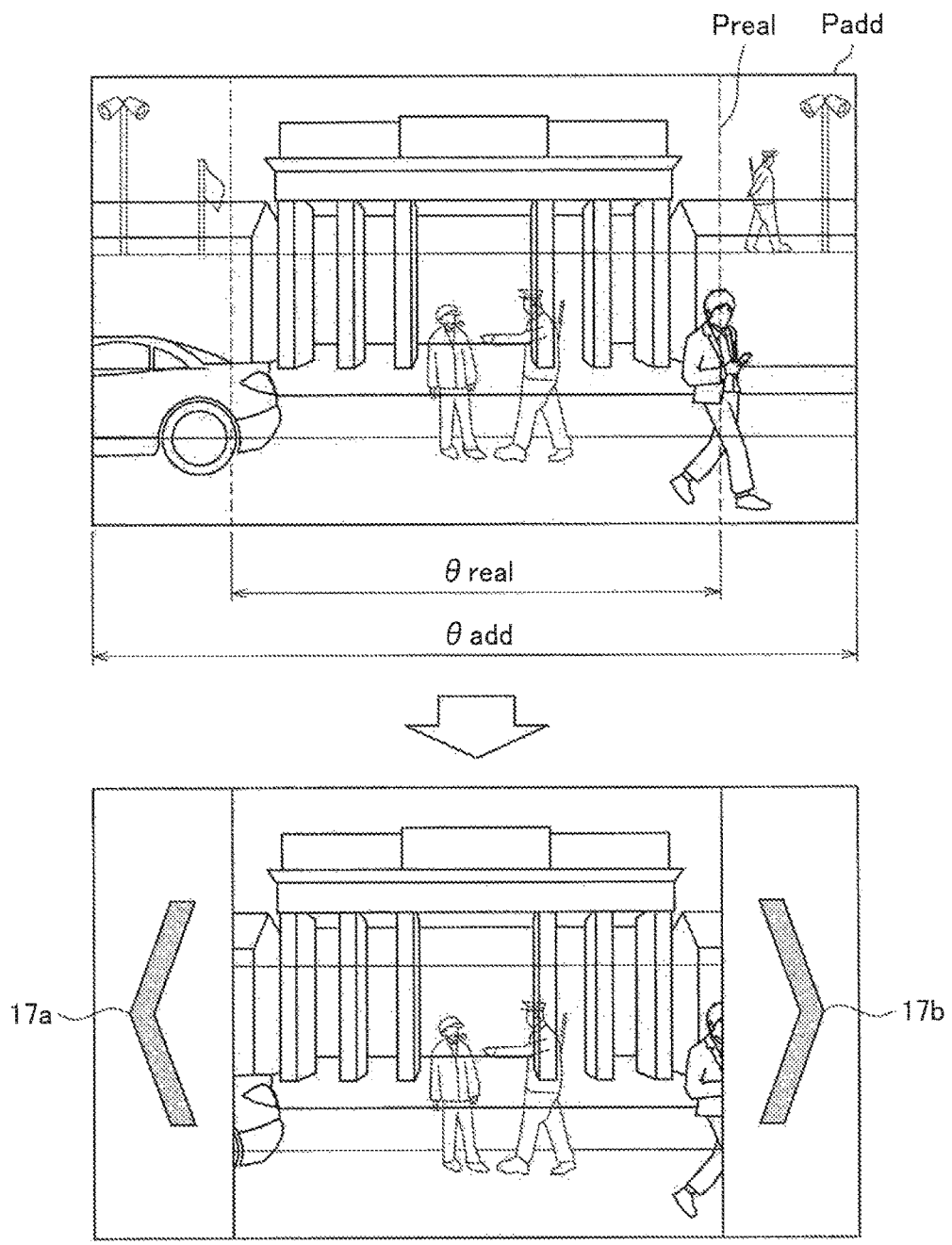
FIG. 10 is an explanatory diagram with regard to adjustment of an angle of view between a real-space image and an additional image.

When, on the other hand, the angle of view $\theta_{add}$ of the additional image $P_{add}$ and the angle of view $\theta_{real}$ of the real-space image $P_{real}$ are different, the presentation processing unit 139 may display angle-of-view adjusting objects 17a and 17b prompting adjustment of the angle of view $\theta_{real}$ of the real-space image $P_{real}$, as illustrated in the lower part of FIG. 10. When, for example, the angle of view $\theta_{add}$ of the additional image $P_{add}$ is larger than angle of view $\theta_{real}$ of the real-space image $P_{real}$, expanding the angle of view of the image capturing device 200 allows for expanding the range of the real-space image $P_{real}$ to be superimposed on the additional image $P_{add}$. Therefore, when the angles of view of respective images are different, the presentation processing unit 139 displays the angle-of-view adjusting objects 17a and 17b to prompt the user to adjust the angle of view $\theta_{real}$ of the real-space image $P_{real}$, thereby allowing for presentation of an image in which the real-space image $P_{real}$ and the additional image $P_{add}$ are superimposed.

Note that, although the angle-of-view adjusting objects 17a and 17b illustrated in FIG. 10 are suitably shaped to notify the expandability of the angle of view $\theta_{real}$ of the real-space image $P_{real}$, the present technique is not limited to such an example. For example, an angle-of-view adjusting object may display a content guiding the user to step back from the current position, or a content prompting to change the shooting direction (line of sight) of the image capturing device 200, according to the difference of angles of view between the real-space image $P_{real}$ and the additional image $P_{add}$.

Handling Change in Real World a) Presentation of Impassable Part

In addition, although displaying the visual guidance information in a manner superimposed on the real-space image $P_{real}$ by the information processing apparatus 100 as described above guides the user to a position where the additional image $P_{add}$ may be appropriately viewed, there may be a case where the situation of the real world has changed from that at the time of acquisition of the additional image. For example, an object that once existed in the past may no longer exist in the real world due to increase or decrease of buildings or topographical change. Such a change in the real world may also include a seasonal one. Given that the situation of the real world may have changed from that at the time of acquisition of the additional image, there may be a case where the user actually fails to arrive at a superimposable area in spite of displaying the information to guide the user to a superimposable area.

Therefore, the presentation processing unit 139 may present, together with the real-space image $P_{real}$, impassability information indicating that the user cannot pass through, based on meta information such as information indicating passability in the real world or material of the land surface provided to the three-dimensional model of the real world by the meta-information providing unit 113. The impassability information is information indicating an impassable part, through which the user cannot physically pass, of a superimposable area identified by comparing, for example, meta information provided to the three-dimensional model of the real world with the superimposable area. On the basis of the impassability information, it becomes possible for the presentation processing unit 139 to let the user recognize an impassable range by displaying the superimposable-area object 15 in a manner separated by coloring into passable parts and impassable parts.

In addition, there may be a part, among impassable parts of a superimposable area, which is passable using particular transportation means, for example, or becomes passable depending on time of year. In such a case, the presentation processing unit 139 may present to the user a condition that allows passage through an impassable part, based on the meta information provided to the three-dimensional model of the real world, according to the user's choice.

Figure 11:
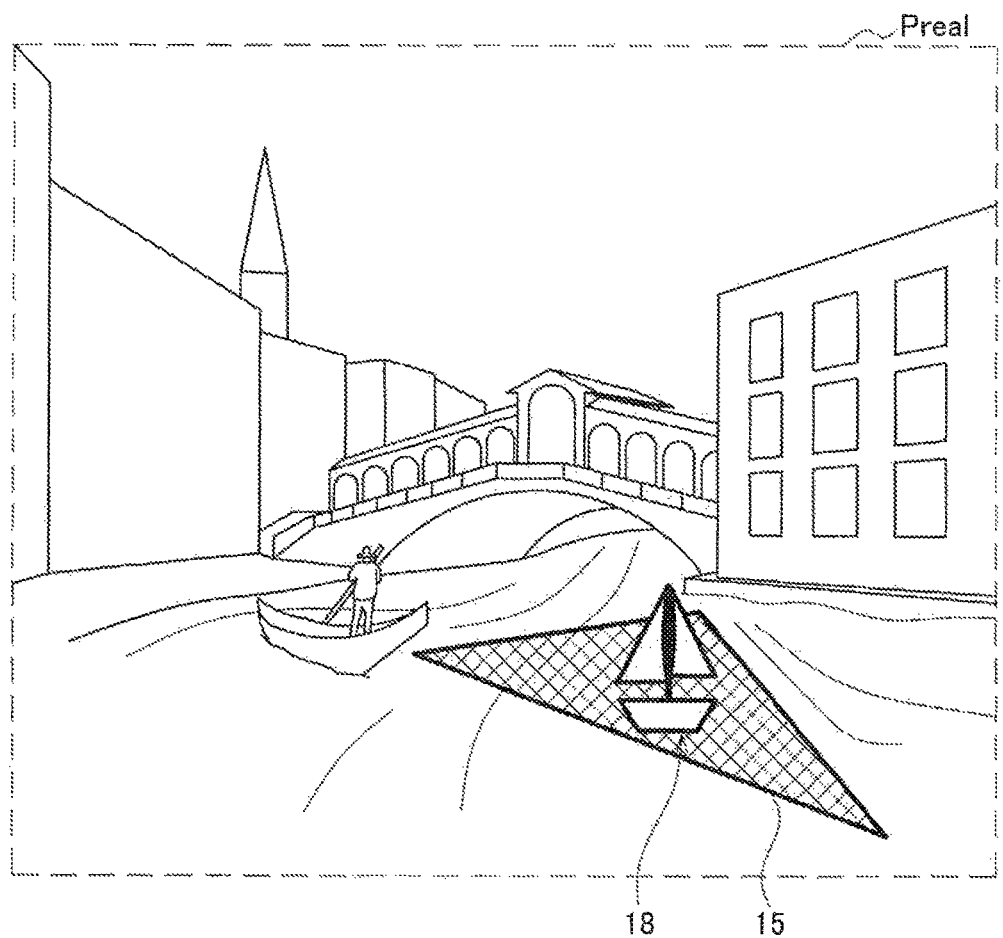
FIG. 11 is an explanatory diagram illustrating an example in which a navigable object indicating navigability is presented together with the superimposable-area object.

Let us assume that the superimposable-area object 15 has been displayed on the water surface, as illustrated in FIG. 11, for example. It is then assumed that the meta information provided at the position of the object 15 in the three-dimensional model includes the fact that a superimposable area exists on the water surface, and that the area is navigable. On the basis of such meta information, the presentation processing unit 139 presents, together with the superimposable-area object 15, for example, a navigable object 18 representing that the area is navigable. An image representing a navigable vehicle such as a boat, for example, may be used as the navigable object 18. Accordingly, the user can visually recognize that the user can move to the superimposable area with a boat or the like.

Figure 12:
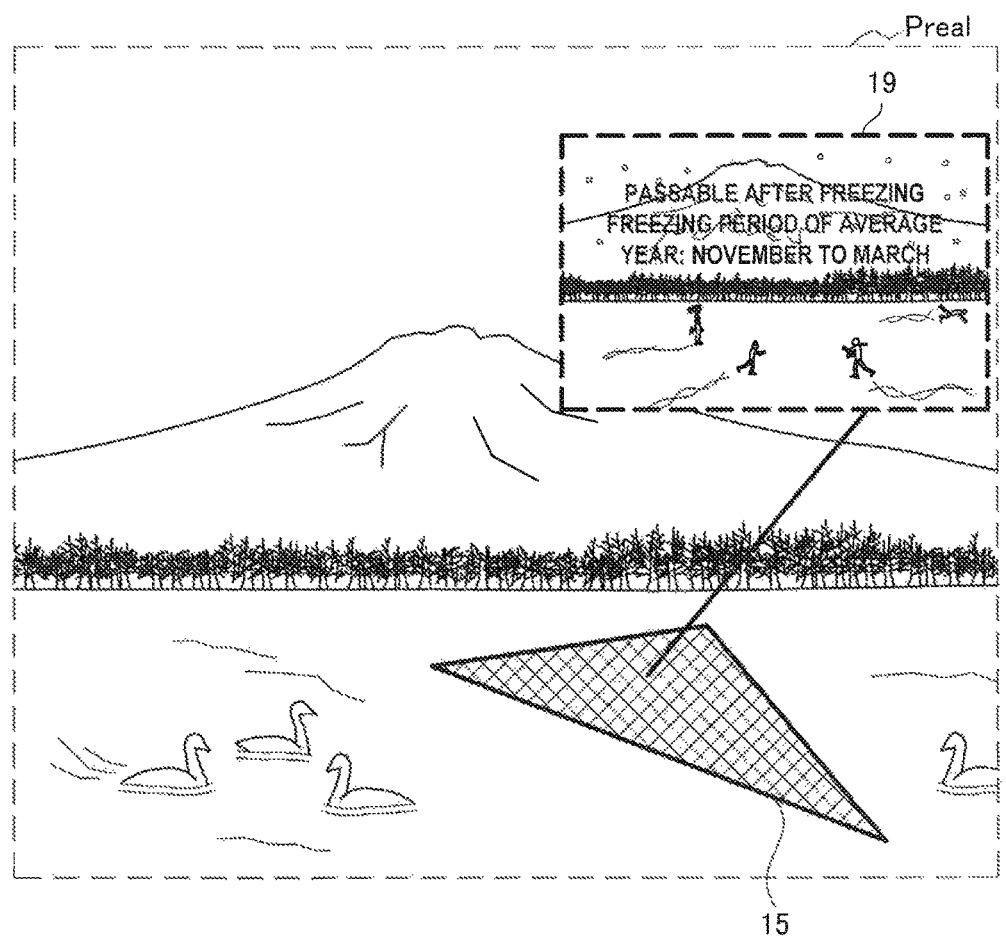
FIG. 12 is an explanatory diagram illustrating an example in which passability during the freezing period and also the freezing period in an average year are presented together with the superimposable-area object.

In addition, let us assume that the superimposable-area object 15 has been displayed on the water surface, as illustrated in FIG. 12, for example. It is then assumed that the meta information provided at the position of the object 15 in the three-dimensional model includes the fact that the superimposable area exists on the water surface and also latitude and longitude information of the position of the object 15. On this occasion, the presentation processing unit 139 accesses the storage unit 120 in the information processing apparatus 100, an external server or the like, and acquires climate information of an average year at the position of the object 15 from the latitude and longitude information. Upon knowing from the climate information that the position of the object 15 freezes during winter, the presentation processing unit 139 displays the fact that the position of the object 15 is pass during the freezing period, and also the freezing period of an average year. An image 19 during the freezing period in the position of the object 15 may be displayed together with the aforementioned pieces of information. Accordingly, the user can visually recognize that the user can move to the superimposable area depending on time of year.

In addition to the foregoing, when there exist impassable roads, obstacles or the like before reaching a superimposable area, the presentation processing unit 139 may display, together with the real-space image, a route to reach the superimposable 16 area while avoiding them.

Note that, when the entire superimposable area is impassable, the presentation processing unit 139 may present, depending on the user's choice, a virtual image at the additional-image viewpoint, which has resulted from synthesizing the three-dimensional model and the additional image, for example.

b) Presentation of Line-of-Sight Blocking Part

Figure 13:
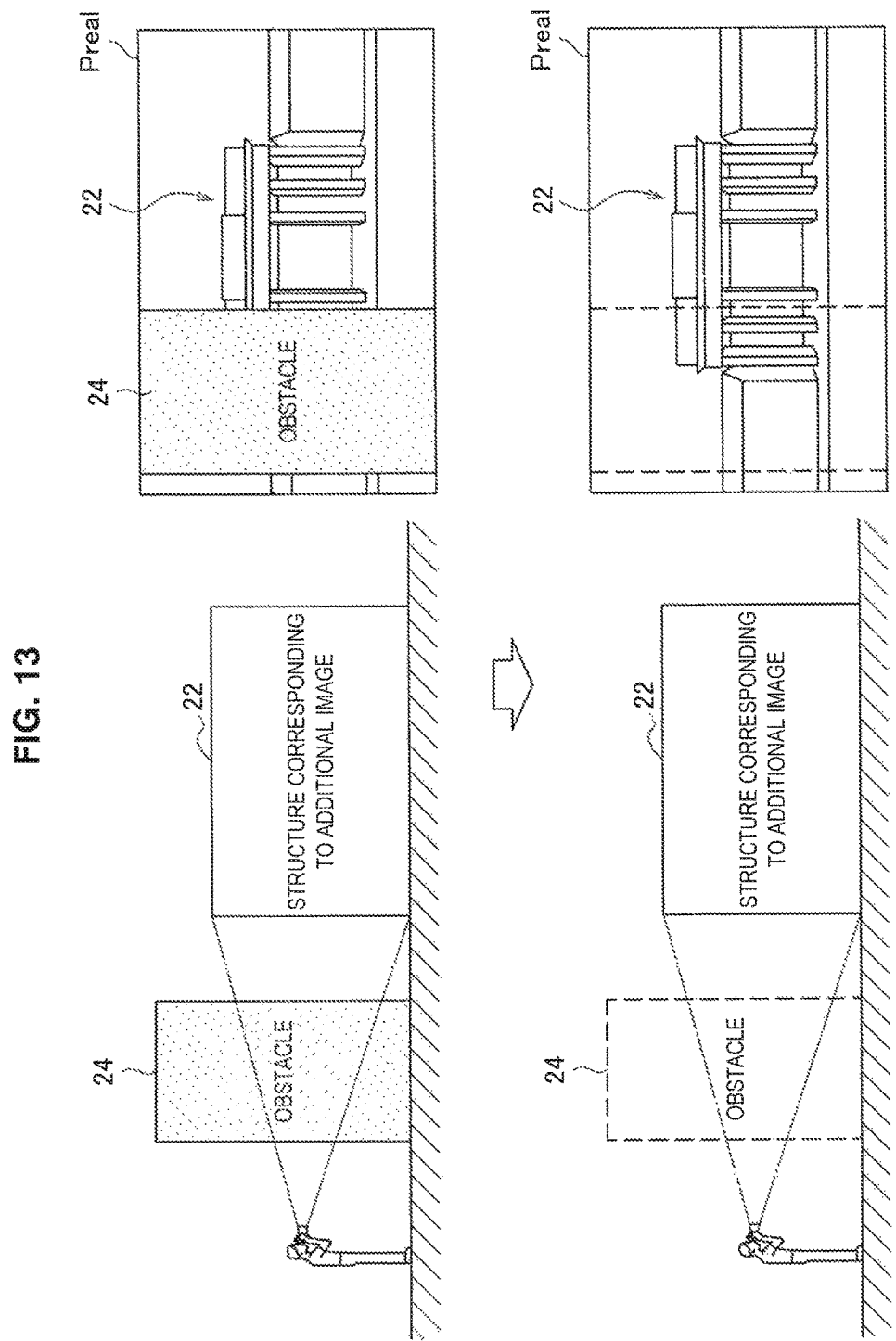
FIG. 13 is an explanatory diagram illustrating a presentation of an image with obstacles excluded from the real-space image.

In addition, there may be a case where the line of sight is blocked from the additional-image viewpoint in the real world due to a change in the real world such as increase of buildings. On this occasion, the presentation processing unit 139 may synthesize, on the part where the line of sight is blocked in the real world, a virtual image estimated from the additional image and the three-dimensional model. Let us assume that an obstacle 24 blocking a part of a structure 22 is included in the real-space image $P_{real}$ acquired by the image capturing device 200, as illustrated in the upper part of FIG. 13, for example. On this occasion, the presentation processing unit 139 identifies the invisible obstacle 24 included in the real-space image $P_{real}$ from the meta information associated with the additional image $P_{add}$ so as to present an image from which the obstacle 24 is excluded. Accordingly, it becomes possible to present to the user an image with the object blocking the subject to be photographed due to a change in the real world having been excluded from the real-space image $P_{real}$.

Figure 14:
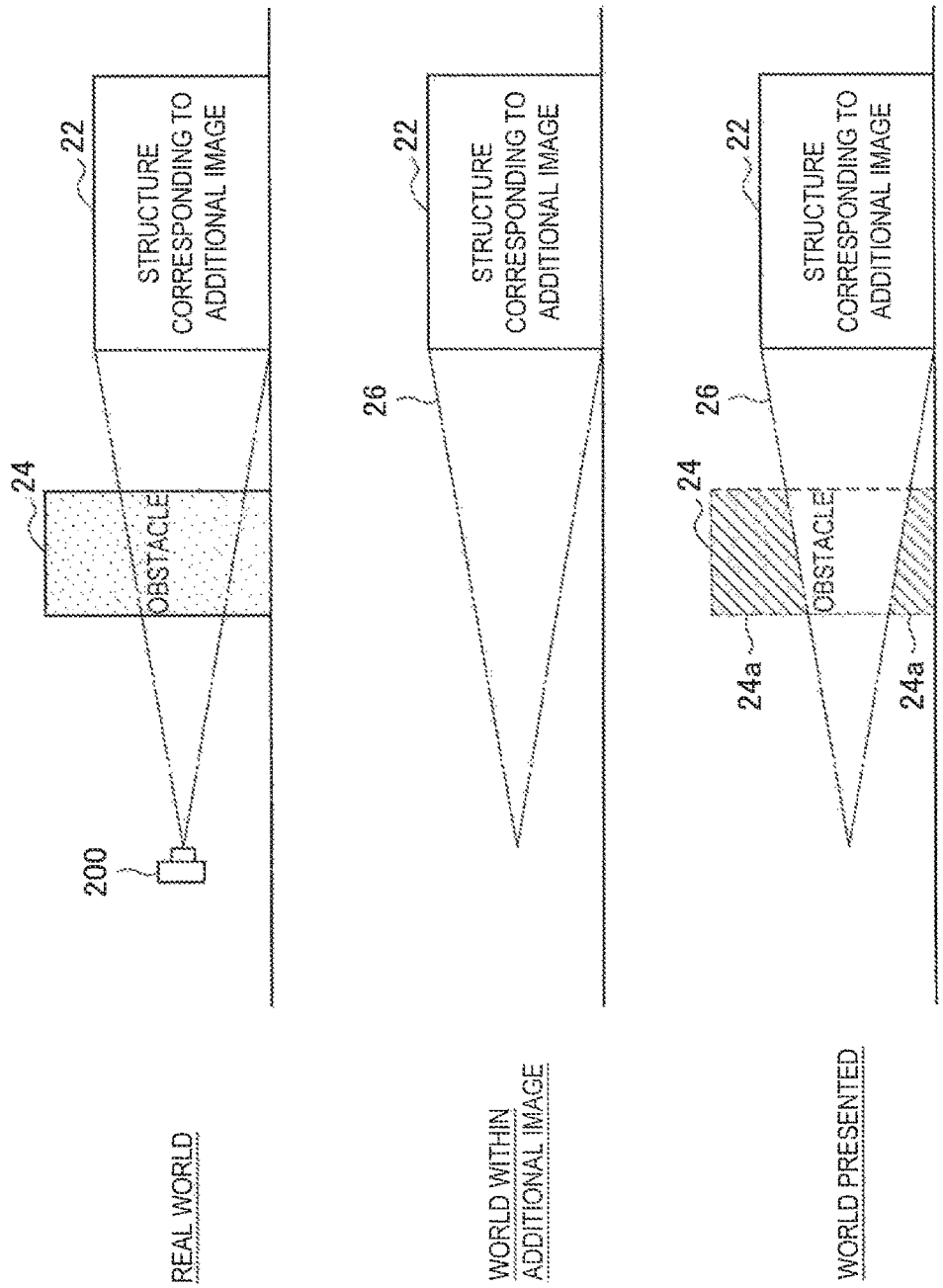
FIG. 14 is an explanatory diagram illustrating a presentation process of an image with obstacles excluded from the real-space image illustrated in FIG. 13.

The aforementioned process will be described in detail, referring to FIG. 14. As illustrated in the upper part of FIG. 14, it is assumed that there exists the real-space image $P_{real}$ acquired by the image capturing device 200 in the real world. On this occasion, the obstacle 24 lies between the structure 22 and the image capturing device 200, and a part of the structure 22 is hidden by the obstacle 24, as illustrated in the top-right of FIG. 13, for example.

When matching is performing between such a real-space image $P_{real}$ and the three-dimensional model, the matching processing unit 135 preliminarily acquires meta information relating to eyesight for an object included in a range in the three-dimensional model to which the real-space real-space image $P_{real}$ corresponds. The meta information relating to eyesight is information indicating the influence of the existence of an object on vision of other objects, that is, for example, information relating to an object such as a wall as to whether or not the wall is transparent. The meta information relating to eyesight is also information provided by the meta-information providing unit 113 of the first processing unit 110 in association with the position of the three-dimensional model of the real world.

After the three-dimensional model has been constructed, the position-and-posture estimation unit 115 and the superimposable-area estimation unit 117 perform a process related to the additional image, and the additional-image registration unit 119 stores the result in the position-and-posture index DB 125. On this occasion, the additional-image registration unit 119 compares the additional image with the constructed three-dimensional model when registering the additional image and detects disagreeing areas. When it is determined that there exists an area in which the additional image and the three-dimensional model do not agree with each other, the additional-image registration unit 119 compares an image included in the disagreeing area with surfaces of a plurality of three-dimensional models lying ahead of the line of sight of the additional image. When some of them agree with each other, it is then determined that the additional image is being blocked by the obstacle 24.

With regard to an additional image determined to be blocked by the obstacle 24, the additional-image registration unit 119 determines whether or not the blocking object is transparent, based on meta information of the surface of the three-dimensional model. When it is determined that the blocking object is transparent, the additional-image registration unit 119 defines objects in the disagreeing area as transparently visible or otherwise invisible, and stores the determination result in the position-and-posture index DB 125 together with the additional image.

Associating the determination result with the additional image allows the presentation processing unit 139 to estimate and present to the user, based on the determination result, an invisible area at each viewpoint in the superimposable area for the real-space image $P_{real}$ acquired by the user with the image capturing device 200. When the invisible obstacle 24 is included in the real-space image $P_{real}$, the presentation processing unit 139 excludes the obstacle 24 from the real-space image $P_{real}$, and synthesizes and presents, in the area where the obstacle 24 has been excluded, the additional image and a landscape virtually generated based on the three-dimensional model. On this occasion, the presentation processing unit 139 is supposed to virtually exclude not only the obstacle 24 included in the field of vision 26 of the user, but also a part 24a of the obstacle 24 located outside of the field of vision 26 of the user, as illustrated in the lower part of FIG. 14.

As has been thus described, even when the line of sight is blocked due to a change in the real world, it is also possible to recognize such a situation and provide a presentation with the obstacle 24 being excluded. Note that such a process may be performed according to the user's choice.

(Pattern γ) Guidance by Meta Guidance Information

Returning to explanation of FIG. 4, when it is determined at step S240 that the user is located outside of a superimposable area, and the additional-image viewpoint is also outside of the field of vision but the distance to the user is small, the presentation processing unit 139 presents meta guidance information together with the real-space image, and guides the user to the superimposable area (S270). The meta guidance information presented at step S270 includes, for example, audio guidance, which is information for audibly guiding the user to the superimposable area. Specifically, there is instructive content such as "move to the right by 2 meters", or the like.

In addition, meta guidance information according to the characteristics of the additional image may be provided. When, for example, a light source is included in the additional image, there may be a presentation such that the image is projected from a virtual extended line thereof. Specifically, when there exists a presentable additional image behind the user, the image may be presented as if illuminated by light radiated from behind the user. When, alternatively, an object generating a sound is included in the additional image, the sound may be output to the user from the direction of the additional image. For example, a bell, a vehicle blowing a steam whistle such as a train or a ship, or an animal may be mentioned as the object generating a sound.

Furthermore, a superimposable area may be drawn on a map and a path to the superimposable area may be displayed, as meta guidance information. Using such meta guidance information allows for visually or audibly notifying the user of the existence of an additional image and guiding the user to the superimposable area, when the user is located near the superimposable area of the additional image. When the user enters the superimposable area, an image having the additional image superimposed on the real-space image is presented to the user, as with step S250.

The preliminary process and the additional image presentation process performed by the information processing apparatus 100 according to the present embodiment have thus been described above. The information processing apparatus 100 first constructs a three-dimensional model representing real space, performs a matching process between preliminarily acquired additional information and the three-dimensional model on the basis of the acquired user's position and direction, and estimates the position and posture and a superimposable area of an additional image presented so that the viewpoint of the additional image corresponds to the real space. The information processing apparatus then guides the user to a position where the user can view the additional image in a manner corresponding to the real world, based on the estimated position and posture of the additional image. Accordingly, the user can view the additional image at an angle of view agreeing with that in the real space, whereby it becomes possible to sufficiently acquire a sense as if the real world is augmented.

2. Second Embodiment

Next, an additional information presentation process performed by the information processing apparatus 100 according to a second embodiment of the present disclosure will be described. The present embodiment describes a case where a three-dimensional model in a particular place is constructed using the information processing apparatus 100, and an additional image associated with this place is displayed in a manner superimposed on the real-space image. In other words, the basic additional image presentation process of the present embodiment is performed in a manner similar to the first embodiment, with a difference in that additional images are displayed in a particular limited place in comparison with the first embodiment.

Figure 15:
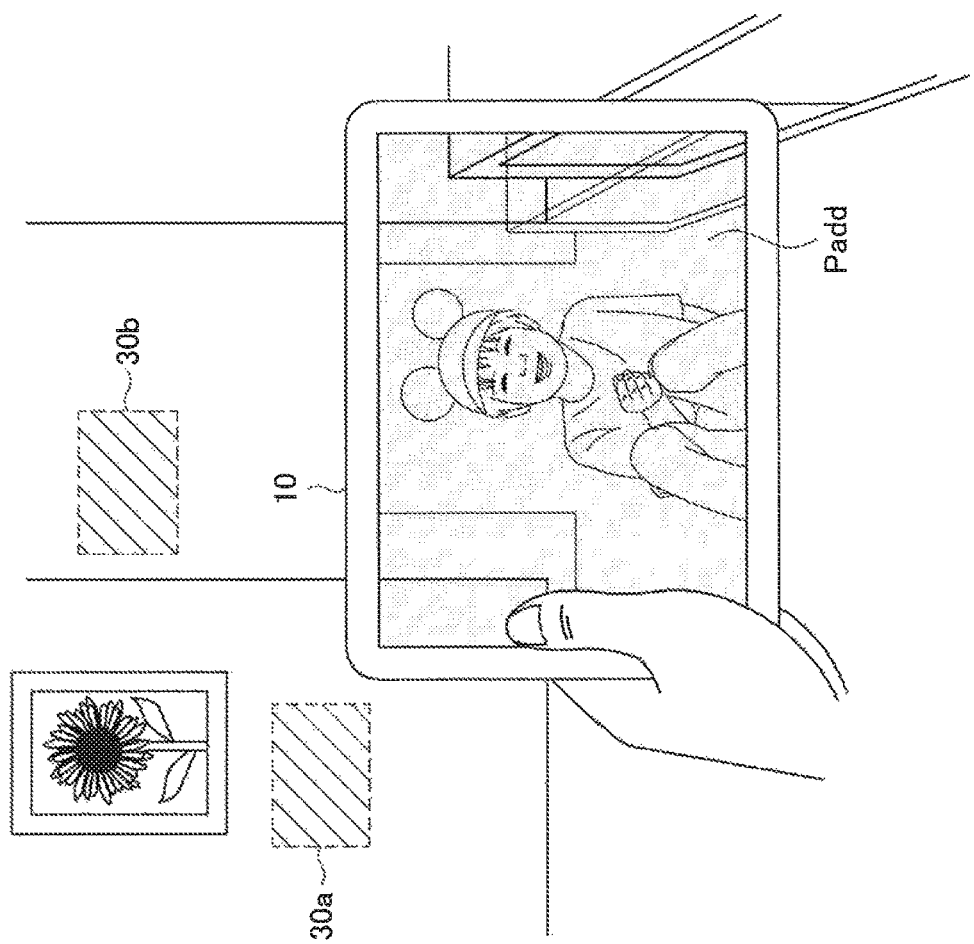
FIG. 15 is an explanatory diagram illustrating an exemplary image presented by the additional image presentation process according to a second embodiment of the present disclosure.

For example, a place familiar for the user such as home is set as the particular place, and photographs of the user or family members taken in the past are used as the additional image. Accordingly, the photographs of family members are displayed in a manner superimposed on the real-space image by the function of the information processing apparatus 100 described above, providing a way of enjoying a family album being displayed in the space. In such a case, for example, the information processing apparatus 100 may be provided in a server or the like of a provider or the like with which the user has contracted, and a three-dimensional model of home, or position and posture in the photograph taken in the past are estimated by providing, by the user, images of home, sensor information, photographs taken in the past to the server. Upon the user acquiring a real-space image using the device 10 at a predetermined position in home, a photograph taken at the predetermined position is provided from the server to the device 10 and displayed in a manner superimposed on the real-space image, as illustrated in FIG. 15, for example.

Specifically, the information processing apparatus 100 first constructs a three-dimensional model using the real-space model construction unit 111 of the first processing unit 110. For example, a three-dimensional model of the user's home is constructed based on a large number of images taken at home or sensor information provided by a special sensor, for example. The three-dimensional model constructed by the real-space model construction unit 111 is held in the server.

In addition, upon the user providing a photograph taken in the past, the position-and-posture estimation unit 115 performs position-and-posture estimation of the photograph in the three-dimensional model. Subsequently, the position and posture information is stored in the position-and-posture index DB 125 together with the photograph.

The user then acquires position and posture of himself/ herself using the device 10. The position and posture of the user himself/herself may be acquired by an environment recognition technique device using a position sensor such as a GPS or images, for example. The second processing unit 130 then identifies, from the user's position and posture, a position in the constructed three-dimensional model of home, and acquires and transmits, to the device 10, a photograph photographed at this position from the position-and-posture index DB 125. The device presents, to the user, the received photograph in a manner superimposed on the real-space image, as illustrated in FIG. 15. Accordingly, the user can enjoy the superimposition of his/her photographs taken in the past.

On this occasion, when the user is not located within the superimposable area of the photograph taken in the past which is the additional image and the viewpoint of the photograph exists in the real-space image photographed by the device 10, there may be provided a presentation to guide the user to the superimposable area of the photograph in a manner similar to the first embodiment. For example, objects 30a and 30b may be displayed, as illustrated in FIG. 15.

In addition, when viewpoints of a plurality of photographs are located at a substantially same position, the information processing apparatus 100 causes the presentation processing unit 139 to display only one arbitrary photograph in a manner superimposed on the real-space image. Note that, when a superimposable-area object is presented, the position of presenting the superimposable-area object may be determined according to the average display position of the respective photographs or the display position of one arbitrary photograph, for example.

In addition, an object representing that a plurality of photographs are browsable may be presented to the user in a manner superimposed on the real-space image. When the object is being displayed, the user can also operate the device 10 to display other photographs in a manner superimposed on the real-space image. On this occasion, a plurality of photographs may be presented together with a time axis. Additionally, in a case of displaying a growth record of a child by superimposing photographs on the real-space image, for example, it is also possible to present the photographs in chronological order by presenting the photographs in association with time stamps of a social medium. In addition, it also becomes possible to present a series of events by arranging photographs taken at different places in chronological order and presenting the display position of a photograph taken at a subsequent time.

Figure 16:
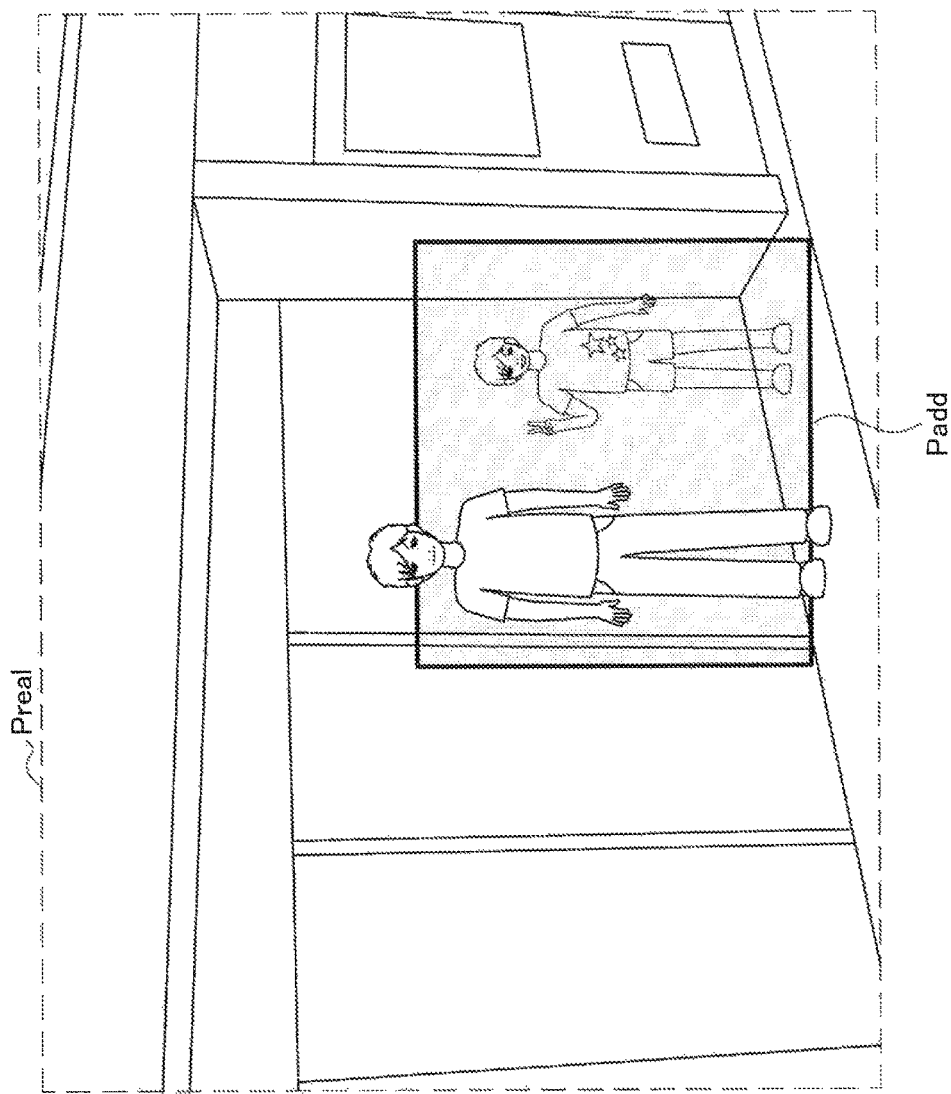
FIG. 16 is an explanatory diagram illustrating another exemplary image presented by an additional image presentation process according to the embodiment.

With the technique according to the present embodiment, it also becomes possible to take a side-by-side photograph of the user appearing in the real-space image $P_{real}$ of the real world and the user in his/her childhood appearing in the additional image $P_{add}$ superimposed on the real-space image, as illustrated in FIG. 16, for example. Similarly, it also becomes possible to superimpose a photograph of the wedding ceremony of the user's parents on the real-space image $P_{real}$ in which the user of the real world is appearing so as to acquire a photograph as if the user is attending at the wedding ceremony of his/her parents.

As has been thus described, various ways of enjoyment become possible by constructing a three-dimensional model at a particular place and displaying additional images related with the particular place in a manner superimposed on the real-space image using the information processing apparatus 100.

3. Exemplary Hardware Configuration

Figure 17:
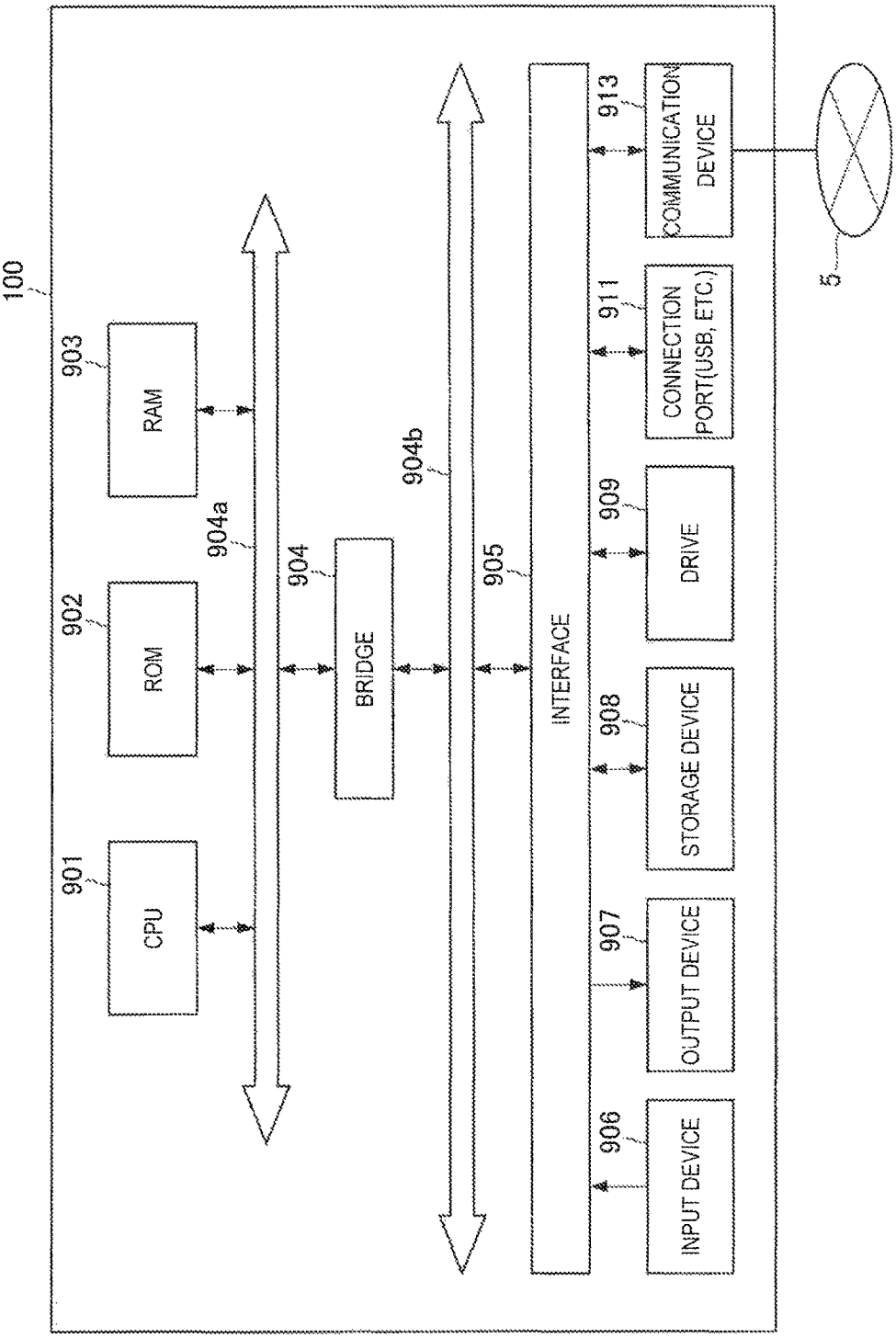
FIG. 17 is a hardware configuration diagram illustrating a hardware configuration of an information processing apparatus according to an embodiment of the present disclosure.

Finally, an exemplary hardware configuration of the information processing apparatus 100 according to the present embodiment will be described. FIG. 17 is a hardware configuration diagram illustrating a hardware configuration of the information processing apparatus 100 according to the present embodiment.

The information processing apparatus 100 in accordance with this embodiment can be realized by a processing device such as a computer as described above. The information processing apparatus 100 includes, as shown in FIG. 17, a CPU (Central Processing Unit) 901, ROM (Read Only Memory) 902, RAM (Random Access Memory) 903, and a host bus 904a. The information processing apparatus 100 also includes a bridge 904, an external bus 904b, an interface 905, an input device 906, an output device 907, a storage device 908, a drive 909, a connection port 911, and a communication device 913.

The CPU 901 functions as an arithmetic processing unit and a control unit, and controls the overall operation within the information processing apparatus 100 in accordance with various programs. The CPU 901 may also be a microprocessor. The ROM 902 stores programs, operation parameters, and the like that are used by the CPU 901. The RAM 903 temporarily stores programs used in execution of the CPU 901, parameters that change as appropriate during the execution of the CPU 901, and the like. These components are mutually connected by the host bus 904a including a CPU bus or the like.

The host bus 904a is connected to the external bus 904b such as a PCI (Peripheral Component Interconnect/Interface) bus via the bridge 904. Note that the host bus 904a, the bridge 904, and the external bus 904b need not be provided separately, and the functions of such components may be integrated into a single bus.

The input device 906 includes input means for a user to input information, such as a mouse, keyboard, touch panel, button, microphone, switch, and lever; an input control circuit that generates an input signal in response to a user's input and outputs the signal to the CPU 901, and the like. Examples of the output device 907 include a display device such as a liquid crystal display (LCD) device, an OLED (Organic Light Emitting Diode) device, or a lamp; and an audio output device such as a speaker.

The storage device 908 is an exemplary storage unit of the information processing apparatus 100. This is a device for storing data. The storage device 908 may include a memory medium, a recording device for recording data on the memory medium, a reading device for reading data from the memory medium, an erasing device for erasing data recorded on the memory medium, and the like. The storage device 908 stores programs and various data that drive the hard disk and are executed by the CPU 901.

The drive 909 is a reader/writer for a memory medium, and is incorporated in or externally attached to the information processing apparatus 100. The drive 909 reads information recorded on a mounted removable recording medium such as a magnetic disk, an optical disc, a magneto-optical disk, or semiconductor memory, and outputs the information to the RAM 903.

The connection port 911 is an interface to be connected to an external device. This is a connection port to an external device that can transfer data via a USB (Universal Serial Bus), for example. The communication device 913 is a communication interface including a communication device or the like to be connected to a communications network 5. The communication device 913 may be any of a communication device supporting a wireless LAN (Local Area Network), a communication device supporting a wireless USB, and a wired communication device that performs wired communication.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In the aforementioned embodiments, for example, although a mobile communication terminal such as a mobile phone, a smart phone, or a tablet terminal has been illustrated as the device 10 allowing the user to view an image in which a real-space image and an additional image are superimposed, the present technique is not limited to such examples. Any type of terminal including at least an image capturing unit and a display unit may be used as the device 10, and the present technique is also applicable to a device which may be put on and used by the user such as, for example, a wearable terminal such as an HMD or an eye-glass type terminal as described above, allowing the user to view naturally superimposed images. Note that the HMD may be a camera-through type configured to capture, and present to the user, images of the outside world with a camera, or a transmission-type which allows direct viewing of the outside world via the display.

In addition, although a case of using photographs or images as additional images has been described in the aforementioned embodiments, the present technique is not limited to such examples. For example, it is also possible to superimpose a painting or the like as an additional image on the real-space image.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing apparatus including
a processing unit configured to display an additional image corresponding to a viewpoint of a user in a real world, and guide the user to a vicinity of a viewpoint in the real world at which the additional image has been acquired.

(2)

The information processing apparatus according to (1),
wherein the processing unit displays the additional image superimposed on an image of the real world.

(3)

The information processing apparatus according to (1) or (2),
wherein the processing unit displays guidance information indicating existence of a superimposable additional image at a position where the additional image is to be superimposed on an image of the real world.

(4)

The information processing apparatus according to any one of (1) to (3),
wherein the processing unit displays, as guidance information, a superimposable area where the additional image is superimposable on an image of the real world.

(5)

The information processing apparatus according to (4),
wherein the processing unit determines the superimposable area by taking into account at least any of position, posture, and angle of view of a terminal.

(6)

The information processing apparatus according to (4) or (5),
wherein the processing unit displays, as meta information, environmental information until movement to the superimposable area.

(7)

The information processing apparatus according to (6),
wherein the environmental information is information indicating material of ground or passability of the user until movement to the superimposable area.

(8)

The information processing apparatus according to (7),
wherein, when the environmental information is information indicating the passability of the user, the processing unit changes content of display of additional information according to the passability.

(9)

The information processing apparatus according to any one of (4) to (8),
wherein the processing unit displays a route until movement to the superimposable area.

(10)

The information processing apparatus according to any one of (1) to (9),
wherein the processing unit displays, on a map being displayed on a terminal, guidance information for guiding the user.

(11)

The information processing apparatus according to any one of (1) to (10),
wherein the processing unit outputs guidance information as sound to guide the user.

(12)

The information processing apparatus according to any one of (1) to (11),
wherein, when superimposing the additional image on the image of the real world results in a cut-off of a part of the additional image, the processing unit performs display prompting angle-of-view adjustment.

(13)

The information processing apparatus according to any one of (1) to (12),
wherein, when there exists an object generated due to a change in the real world, the processing unit displays a virtual image without the object in a superimposed manner, based on the additional image and a three-dimensional model of the real world.

(14)

The information processing apparatus according to any one of (1) to (12),
wherein the processing unit
determines the additional image to be superimposed on an image of the real world, based on a three-dimensional model of the real world estimated based on a preliminarily acquired image, and
displays, as an additional image, a pseudo image from which an object generated due to a change in the real world has been excluded, if the three-dimensional model and the object agree with each other when there exists the object.

(15)

The information processing apparatus according to any one of (1) to (14),
wherein the processing unit performs a matching process between the additional image and only a three-dimensional model near a user's position detected by a position sensor, when determining the additional image to be superimposed on an image of the real world on the basis of a model estimated based on position information.

(16)

The information processing apparatus according to any one of (1) to (15), wherein, when displaying an additional image superimposed on an image of the real world, the processing unit performs image processing to adjust color tone of at least either the image of the real world or the additional image.

(17)

The information processing apparatus according to any one of (1) to (16), wherein the processing unit performs image processing on the additional image to blur a boundary with the image of the real world to be superimposed.

(18)

The information processing apparatus according to (16) or (17), wherein the processing unit performs the image processing when a user is located in a superimposable area where the additional image is superimposable on the image of the real world.

(19)

An information processing method including:

displaying an additional image corresponding to a viewpoint of a user in a real world, and guiding the user to a vicinity of a viewpoint in the real world at which the additional image has been acquired.

REFERENCE SIGNS LIST 10 device
100 information processing apparatus
110 first processing unit
111 real-space model construction unit
113 meta-information providing unit
115 position-and-posture estimation unit
117 superimposable-area estimation unit
119 additional-image registration unit
120 storage unit
121 real-space model DB
123 additional-image DB
125 position-and-posture index DB
130 second processing unit
131 information acquisition unit
133 model-search-area extraction unit
135 matching processing unit
137 additional-image acquisition unit
139 presentation processing unit
$P_{add}$ additional image
$P_{real}$ real-space image

The invention claimed is:

1. An information processing apparatus comprising:
circuitry configured to
initiate display of guidance information to guide a user to a vicinity of a viewpoint in a real world at which an additional image of the real world has been previously acquired,
detect whether a position of the user is located within the vicinity of the viewpoint,
initiate display of the additional image corresponding to a viewpoint of the user in the real world, based on the detected position, wherein the guidance information represents the additional image, and wherein the guidance information is displayed, in an image of the real world at a position where the additional image is to be superimposed on the image of the real world, to correspond to the viewpoint of the user in the real world, and perform, when displaying the additional image superimposed on the image of the real world, image processing to adjust color tone of at least one of the image of the real world or the additional image so that the color tone of the image of the real world and the color tone of the additional image conform to each other, wherein the performing of the image processing to adjust the color tone comprises
analyzing color distribution of pixels in a boundary between the image of the real world and the additional image, and
adjusting color of pixels of at least one of the image of the real world or the additional image, based on a result of the analysis, wherein each of the image of the real world and the additional image includes pixels in the boundary and pixels outside the boundary, and wherein the performing of the image processing to adjust color tone is performed on only the pixels in the boundary.

2. The information processing apparatus according to claim 1, wherein the circuitry is further configured to initiate display of the additional image superimposed on the image of the real world.

3. The information processing apparatus according to claim 1, wherein the circuitry is further configured to initiate display of the guidance information representing the additional image at a position substantially perpendicular to a line of sight of a viewpoint at which the additional image has been acquired.

4. The information processing apparatus according to claim 3, wherein the circuitry is further configured to initiate display of the guidance information together with a text object explaining a content of the additional image.

5. The information processing apparatus according to claim 1, wherein the circuitry is further configured to initiate display of, as the guidance information, a superimposable area where the additional image is superimposable on the image of the real world.

6. The information processing apparatus according to claim 5, wherein the circuitry is further configured to determine the superimposable area by taking into account at least any of position, posture, and angle of view of a terminal.

7. The information processing apparatus according to claim 5, wherein the circuitry is further configured to initiate display of, as meta information, environmental information until movement to the superimposable area.

8. The information processing apparatus according to claim 7, wherein the environmental information includes information indicating material of ground or passability of the user until movement to the superimposable area.

9. The information processing apparatus according to claim 8, wherein, when the environmental information includes information indicating the passability of the user, the circuitry is further configured to change content of display of additional information according to the passability.

10. The information processing apparatus according to claim 5, wherein the circuitry is further configured to initiate display of a route until movement to the superimposable area.

11. The information processing apparatus according to claim 5, wherein the circuitry is further configured to
initiate display of, as the guidance information, a land surface part of the real world corresponding to the superimposable area.

12. The information processing apparatus according to claim 1, wherein the circuitry is further configured to
initiate display of, on a map being displayed by a terminal, the guidance information for guiding the user.

13. The information processing apparatus according to claim 1, wherein the circuitry is further configured to
initiate output of the guidance information as sound to guide the user.

14. The information processing apparatus according to claim 1, wherein, when superimposing the additional image on the image of the real world results in a cut-off of a part of the additional image, the circuitry is further configured to
initiate display of an object prompting angle-of-view adjustment.

15. The information processing apparatus according to claim 1, wherein, when there exists an object generated due to a change in the real world, the circuitry is further configured to
initiate display of a virtual image without the object in a superimposed manner, based on the additional image and a three-dimensional model of the real world.

16. The information processing apparatus according to claim 1, wherein the circuitry is further configured to
determine the additional image to be superimposed on the image of the real world, based on a three-dimensional model of the real world estimated based on a preliminarily acquired image, and
initiate display of, as an additional image, a pseudo image from which an object generated due to a change in the real world has been excluded, if the three-dimensional model and the object agree with each other when there exists the object.

17. The information processing apparatus according to claim 1, wherein the circuitry is further configured to
perform a matching process between the additional image and only a three-dimensional model near a position of the user detected by a position sensor, when determining the additional image to be superimposed on the image of the real world on a basis of a model estimated based on position information.

18. The information processing apparatus according to claim 1, wherein the circuitry is further configured to
perform image processing on the additional image to blur a boundary with the image of the real world to be superimposed.

19. The information processing apparatus according to claim 1, wherein the circuitry is further configured to
perform the image processing when the user is located in a superimposable area where the additional image is superimposable on the image of the real world.

20. The information processing apparatus according to claim 1, wherein the circuitry is further configured to
initiate display of, as the guidance information, a photographer object having photographed the additional image.

21. The information processing apparatus according to claim 1,
wherein the performing of the image processing to adjust color tone further comprises
adjusting color of the pixels in the boundary.

22. An information processing method, the method being executed via at least one processor having circuitry, and comprising:
displaying guidance information to guide a user to a vicinity of a viewpoint in a real world at which an additional image of the real world has been previously acquired;
detecting whether a position of the user is located within the vicinity of the viewpoint;
displaying the additional image corresponding to a viewpoint of the user in the real world, based on the detected position, wherein the guidance information represents the additional image, and wherein the guidance information is displayed, in an image of the real world at a position where the additional image is to be superimposed on the image of the real world, to correspond to the viewpoint of the user in the real world; and
performing, when displaying the additional image superimposed on the image of the real world, image processing to adjust color tone of at least one of the image of the real world or the additional image so that the color tone of the image of the real world and the color tone of the additional image conform to each other,
wherein the performing of the image processing to adjust the color tone comprises
analyzing color distribution of pixels in a boundary between the image of the real world and the additional image, and
adjusting color of pixels of at least one of the image of the real world or the additional image, based on a result of the analysis,
wherein each of the image of the real world and the additional image includes pixels in the boundary and pixels outside the boundary, and
wherein the performing of the image processing to adjust color tone is performed on only the pixels in the boundary.

23. A non-transitory computer-readable medium having embodied thereon a program, which when executed by a computer causes the computer to execute an information processing method, the method comprising:
displaying guidance information to guide a user to a vicinity of a viewpoint in a real world at which an additional image of the real world has been previously acquired;
detecting whether a position of the user is located within the vicinity of the viewpoint;
displaying the additional image corresponding to a viewpoint of the user in the real world, based on the detected position, wherein the guidance information represents the additional image, and wherein the guidance information is displayed, in an image of the real world at a position where the additional image is to be superimposed on the image of the real world, to correspond to the viewpoint of the user in the real world; and
performing, when displaying the additional image superimposed on the image of the real world, image processing to adjust color tone of at least one of the image of the real world or the additional image so that the color tone of the image of the real world and the color tone of the additional image conform to each other,
wherein the performing of the image processing to adjust the color tone comprises
analyzing color distribution of pixels in a boundary between the image of the real world and the additional image, and adjusting color of pixels of at least one of the image of the real world or the additional image, based on a result of the analysis, wherein each of the image of the real world and the additional image includes pixels in the boundary and pixels outside the boundary, and wherein the performing of the image processing to adjust color tone is performed on only the pixels in the boundary.

\* \* \* \* \*